US010223250B2

(12) United States Patent
Ouzzani et al.

(10) Patent No.: US 10,223,250 B2
(45) Date of Patent: Mar. 5, 2019

(54) SYSTEM AND METHOD FOR CHECKING DATA FOR ERRORS

(71) Applicant: Qatar Foundation, Doha (QA)

(72) Inventors: Mourad Ouzzani, Doha (QA); Paolo Papotti, Doha (QA); Ihab Francis Ilyas Kaldas, Doha (QA); Anup Chalmalla, Doha (QA)

(73) Assignee: QATAR FOUNDATION, Doha (QA)

( * ) Notice: Subject to any disclaimer, the term of this patent is extended or adjusted under 35 U.S.C. 154(b) by 105 days.

(21) Appl. No.: 15/104,108

(22) PCT Filed: May 27, 2014

(86) PCT No.: PCT/GB2014/051609
§ 371 (c)(1),
(2) Date: Jun. 13, 2016

(87) PCT Pub. No.: WO2015/087034
PCT Pub. Date: Jun. 18, 2015

(65) Prior Publication Data
US 2016/0364325 A1     Dec. 15, 2016

(30) Foreign Application Priority Data
Dec. 13, 2013   (GB) .................................. 1322057.9

(51) Int. Cl.
*G06F 11/00*   (2006.01)
*G06F 11/36*   (2006.01)
*G06F 17/30*   (2006.01)

(52) U.S. Cl.
CPC ...... *G06F 11/3692* (2013.01); *G06F 11/3684* (2013.01); *G06F 11/3688* (2013.01);
(Continued)

(58) Field of Classification Search
CPC ................................................. G06F 17/30303
See application file for complete search history.

(56) References Cited

U.S. PATENT DOCUMENTS 5,577,249 A  *  11/1996  Califano  ........... G06F 17/30985
                                                              382/209
8,473,519 B1      6/2013  Siddiqui et al.
(Continued)

OTHER PUBLICATIONS

Beskales et al., "Sampling the Repairs of Functional Dependency Violations under Hard Constraints," Proceedings of the VLDB Endowment, vol. 3, No. 1, Sep. 13-17, 2010, 11 pgs.
(Continued)

*Primary Examiner* — Marc Duncan
*Assistant Examiner* — Jonathan D Gibson
(74) *Attorney, Agent, or Firm* — Martin & Ferraro, LLP

(57) ABSTRACT

A system for checking data for errors, the system comprising a checking module operable to check tuples of data stored in a target database for errors, the tuples in the target database originating from the output of at least one query transformation module which applies a query transformation to tuples of data from at least one data source an identification module operable to identify a problematic tuple from a data source that produces an error in the target database, the identification module being operable to quantify the contribution of the problematic tuple in producing the error in the target database, and a description generation module operable to generate a descriptive query which represents at least one of errors identified by the checking module in the target database which are produced by the at least one query transformation module, and problematic tuples identified in a data source by the identification module.

21 Claims, 13 Drawing Sheets

Figure 1:
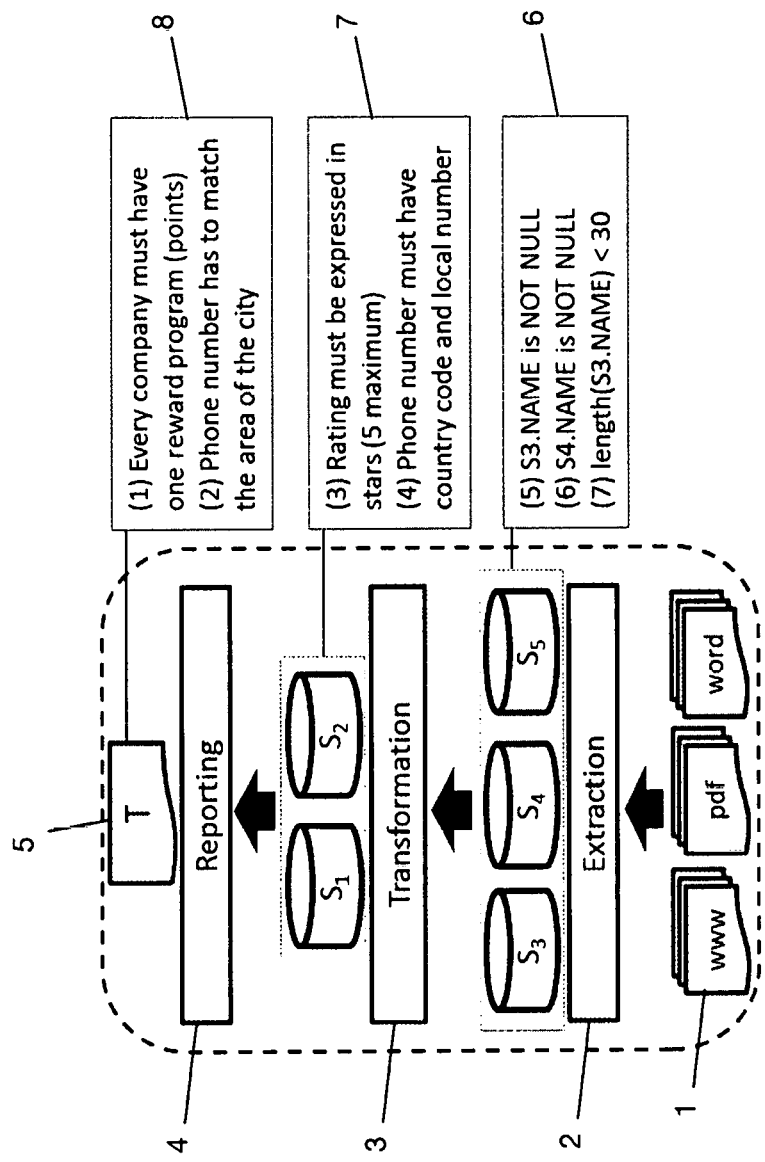

(52) U.S. Cl.
CPC .... *G06F 17/3056* (2013.01); *G06F 17/30289* (2013.01); *G06F 17/30303* (2013.01)

(56) References Cited

U.S. PATENT DOCUMENTS

| | | | | |
|---|---|---|---|---|
| 8,577,849 | B2* | 11/2013 | Yakout | G06F 17/30303 707/690 |
| 8,782,016 | B2* | 7/2014 | Kaldas | G06F 17/30303 707/690 |
| 9,037,550 | B2* | 5/2015 | Talukder | G06F 17/30286 707/690 |
| 9,116,934 | B2* | 8/2015 | Kaldas | G06F 17/30303 |
| 9,325,344 | B2* | 4/2016 | Beier | H03M 7/40 |
| 9,418,086 | B2* | 8/2016 | Gordon | G06F 17/30292 |
| 9,619,494 | B2* | 4/2017 | Yakout | G06F 17/30303 |
| 2004/0249789 | A1* | 12/2004 | Kapoor | G06F 17/30303 |
| 2004/0260694 | A1* | 12/2004 | Chaudhuri | G06F 17/30542 |
| 2009/0006302 | A1* | 1/2009 | Fan | G06F 17/30303 706/48 |
| 2009/0164445 | A1* | 6/2009 | Werner | G06F 17/30303 |
| 2012/0303555 | A1* | 11/2012 | Yakout | G06F 17/30303 706/12 |
| 2013/0275393 | A1* | 10/2013 | Kaldas | G06F 17/30303 707/692 |
| 2013/0346426 | A1* | 12/2013 | O'Byrne | G06F 17/30309 707/754 |
| 2014/0280342 | A1* | 9/2014 | Litherland | G06F 17/30542 707/780 |

OTHER PUBLICATIONS

Bohannon et al., "Conditional Functional Dependencies for Data Cleaning," 2007 IEEE 23rd International Conference on Data Engineering, Apr. 15-20, 2007, 10 pgs.
Cheney et al., "Provenance in Databases: Why, How, and Where," Foundations and Trends in Databases, vol. 1, No. 4 (2007) 379-474, Jan. 2009, 98 pgs.
Chu et al., "Holistic Data Cleaning: Putting Violations Into Context," IEEE 29th International Conference on Data Engineering (ICDE), 2013, Mar. 2013, 12 pgs.
Chvatal, "A Greedy Heuristic for the set-covering problem," Mathematics of Operations Research, vol. 4, No. 3, pp. 233-235, Aug. 1979, 4 pgs.
Cong et al., "On the Complexity of View Update Analysis and Its Application to Annotation Propagation," IEEE Transactions on knowledge and data engineering, vol. 24, No. 3, pp. 506-519, Jan. 2011, 14 pgs.
Cui et al., "Practical Lineage Tracing in Data Warehouses," In ICDE, 1999, 21 pgs.
Dong et al., "Truth Discovery and Copying Detection in a Dynamic World," VLDB '09, pp. 562-573, Aug. 24-28, 2009, 12 pgs.
Fan, Wenfei, et al., "Propagating Functional Dependencies with Conditions," PVLDB '08, pp. 391-407, Aug. 23-28, 2008, 17 pgs.
Herschel et al., "Explaining Missing Answers to SPJUA Queries," Proceedings of the VLDB Endowment, vol. 3, No. 1, Sep. 13-17, 2010, pp. 185-196, 12 pgs.
Hochbaum, "Heuristics for the fixed cost median problem," Mathematical Programming 22 (1982) 148-162, North-Holland Publishing Company, Dec. 1982, 15 pgs.
Kanagal et al., "Sensitivity Analysis and Explanations for Robust Query Evaluation in Probabilistic Databases," SIGMOD'11, pp. 841-852, Jun. 12-16, 2011, 12 pgs.
Kolahi et al., "On Approximating Optimum Repairs for Functional Dependency Violations," ICDT 2009, pp. 53-62, Mar. 23-25, 2009, 10 pgs.
Meliou et al., "Tracing Data Errors with View-Conditioned Causality," SIGMOD'11, pp. 505-516, Jun. 12-16, 2011, 12 pgs.
Sarma et al., "Synthesizing View Definitions from Data," ICDT 2010, pp. 89-103, Mar. 22-25, 2010, 15 pgs.
Tran et al., "How to ConQueR Why-Not Questions," SIGMOD'10, pp. 15-26, Jun. 6-11, 2010, 12 pgs.
Wu et al., "A Demonstration of DBWipes: Clean as You Query," Proceedings of the VLDB Endowment, vol. 5, No. 12, pp. 1894-1897, Aug. 27-31, 2012, 4 pgs.
Wu et al., "Scorpion: Explaining Away Outliers in Aggregate Queries," Proceedings of the VLDB Endowment, vol. 6, No. 8, pp. 553-564, Aug. 26-30, 2013, 12 pgs.

* cited by examiner

| T | Shop | Size | Grd | AvgSal | #Emps | Region |
|---|---|---|---|---|---|---|
| $t_a$ | NY1 | 46 ft² | 2 | 99 $ | 1 | US |
| $t_b$ | NY1 | 46 ft² | 1 | 100 $ | 3 | US |
| $t_c$ | NY2 | 62 ft² | 2 | 96 $ | 2 | US |
| $t_d$ | NY2 | 62 ft² | 1 | 90 $ | 2 | US |
| $t_e$ | LA1 | 35 ft² | 2 | 105 $ | 2 | US |

| Emps | Eid | Name | Dept | Sal | Grd | Sid | JoinYr |
|---|---|---|---|---|---|---|---|
| $t_1$ | e4 | John | S | 91 | 1 | NY1 | 2012 |
| $t_2$ | e5 | Anne | D | 99 | 2 | NY1 | 2012 |
| $t_3$ | e7 | Mark | S | 93 | 1 | NY1 | 2012 |
| $t_4$ | e8 | Claire | S | 116 | 1 | NY1 | 2012 |
| $t_5$ | e11 | Ian | R | 89 | 2 | NY2 | 2012 |
| $t_6$ | e13 | Laure | R | 94 | 1 | NY2 | 2012 |
| $t_7$ | e14 | Mary | E | 91 | 2 | NY2 | 2012 |
| $t_8$ | e18 | Bill | D | 98 | 2 | NY2 | 2012 |
| $t_9$ | e14 | Mike | R | 94 | 2 | LA1 | 2011 |
| $t_{10}$ | e18 | Claire | E | 116 | 2 | LA1 | 2011 |

| Shops | Sid | City | State | Size | Started |
|---|---|---|---|---|---|
| $t_{11}$ | NY1 | New York | NY | 46 | 2011 |
| $t_{12}$ | NY2 | New York | NY | 62 | 2012 |
| $t_{13}$ | LA1 | Los Angeles | CA | 35 | 2011 |

Figure 2

| T | Shop | avgHours |
|---|---|---|
| $t_a$ | NY1 | 23 |
| $t_b$ | NY2 | 25 |

| Shifts | Sid | Hours | Week | Clerk |
|---|---|---|---|---|
| $t_1$ | NY1 | 20 | 11 | John |
| $t_2$ | NY1 | 20 | 11 | Anne |
| $t_3$ | NY1 | 30 | 12 | Anne |
| $t_4$ | NY1 | 30 | 12 | John |
| $t_5$ | NY1 | 22 | 13 | John |
| $t_6$ | NY1 | 22 | 13 | John |
| $t_7$ | NY1 | 17 | 14 | John |
| $t_8$ | NY2 | 20 | 11 | Laure |
| $t_9$ | NY2 | 30 | 11 | Bill |

Figure 4

| $I_1^1$ | Sid [CSV] | Size [CSV] | Grd [CSV] | Sal [CSV] | Eid [CSV] |
|---|---|---|---|---|---|
| $i_1^1$ | NY1 $[\frac{1}{3}, "]$ | 46 ft² $[", \frac{1}{3}]$ | 1 $[\frac{1}{3}, \frac{1}{3}]$ | 91 $[\frac{91}{300}, "]$ | $e4 [", \frac{1}{3}]$ |
| $i_2^1$ | NY1 $[1, "]$ | 46 ft² | 2 $[1, "]$ | 99 $[0, "]$ | e5 |
| $i_3^1$ | NY1 $[\frac{1}{3}, "]$ | 46 ft² $[", \frac{1}{3}]$ | 1 $[\frac{1}{3}, \frac{1}{3}]$ | 93 $[\frac{93}{300}, "]$ | $e7 [", \frac{1}{3}]$ |
| $i_4^1$ | NY1 $[\frac{1}{3}, "]$ | 46 ft² $[", \frac{1}{3}]$ | 1 $[\frac{1}{3}, \frac{1}{3}]$ | 116 $[\frac{116}{300}, "]$ | $e8 [", \frac{1}{3}]$ |
| $i_5^1$ | NY2 | 62 ft² $[", \frac{1}{2}]$ | 1 $[", \frac{1}{2}]$ | 89 | $e11 [", \frac{1}{2}]$ |
| $i_6^1$ | NY2 | 62 ft² | 2 | 94 | e13 |
| $i_7^1$ | NY2 | 62 ft² $[", \frac{1}{2}]$ | 1 $[", \frac{1}{2}]$ | 91 | $e14 [", \frac{1}{2}]$ |
| $i_8^1$ | NY2 | 62 ft² | 2 | 98 | e18 |
| $i_9^1$ | LA1 | 35 ft² | 2 | 94 $ | e19 |
| $i_{10}^1$ | LA1 | 35 ft² | 2 | 116 $ | e20 |

Figure 5

Figure 7

| Emps | EId [CSV] | Sal [CSV] | Grd [CSV] | SId [CSV] | [RSV] |
|---|---|---|---|---|---|
| $t_1$ | e4 ['', $\frac{1}{3}$] | 91 [$\frac{91}{300}$, ''] | 1 [$\frac{1}{3}$, $\frac{1}{3}$] | NY1 [$\frac{1}{3}$, ''] | [0,1] |
| $t_2$ | e5 | 99 [0, ''] | 2 [1, ''] | NY1 [1, ''] | [1, ''] |
| $t_3$ | e7 ['', $\frac{1}{3}$] | 93 [$\frac{93}{300}$, ''] | 1 [$\frac{1}{3}$, $\frac{1}{3}$] | NY1 [$\frac{1}{3}$, ''] | [0,1] |
| $t_4$ | e8 ['', $\frac{1}{3}$] | 116 [$\frac{116}{300}$, ''] | 1 [$\frac{1}{3}$, $\frac{1}{3}$] | NY1 [$\frac{1}{3}$, ''] | [1,1] |
| $t_5$ | e11 ['', $\frac{1}{2}$] | 89 | 1 ['', $\frac{1}{2}$] | NY2 | ['',0] |
| $t_6$ | e13 | 94 | | | □ |
| $t_7$ | e14 ['', $\frac{1}{2}$] | 91 | 1 ['', $\frac{1}{2}$] | NY2 | ['',0] |
| $t_8$ | e18 | 98 | 2 | NY2 | □ |
| $t_9$ | e14 | 94 | 2 | LA1 | □ |
| $t_{10}$ | e18 | 116 | 2 | LA1 | □ |

Figure 8

| Shops | SId [CSV] | Size [CSV] | [RSV] |
|---|---|---|---|
| $t_{12}$ | NY1 [2, ''] | 46 ['', 1] | [1,1] |
| $t_{13}$ | NY2 | 62 ['', 1] | ['',1] |
| $t_{14}$ | LA1 | 35 | □ |

SYSTEM AND METHOD FOR CHECKING DATA FOR ERRORS

This is a National Phase Application under 35 USC 371 of PCT/GB2014/051609 filed May 27, 2014 (published on Jun. 18, 2015 as WO 2015/087034); which claims priority to Great Britain Application No. 1322057.9 filed Dec. 13, 2013; all of which are incorporated by reference herein in their entirety.

The present invention relates to a system and method for checking data for errors, and more particularly relates to a system and method for checking data for errors and identifying the origin of the errors.

1 INTRODUCTION

A common approach to address the long standing problem of dirty data is to apply a set of data quality rules or constraints over a target database, to "detect" and to eventually "repair" erroneous data. Tuples or cells (an attribute-value of a tuple) in a database D that are inconsistent w.r.t. a set of rules $\Sigma$ are considered to be in violation of the rules and thus possibly "dirty". A repairing step tries to "clean" these violations by producing a set of updates over D leading to a new database D' that satisfies $\Sigma$. Unfortunately, in many real life scenarios, the data and rules are decoupled in space and time; constraints are often declared not on the original data but rather on reports or views, and at a much later stage in the data processing life cycle. This can render the data cleaning system unreliable and inefficient.

FIG. 1 of the accompanying drawings shows an example of a multi-level scenario in which data undergoes several transformations. In this example, data is extracted from original documents 1 using an extraction process 2 which stores the extracted data in data sources $S_3$, $S_4$ and $S_5$. A transformation process 3 is carried out on the data from the data sources $S_3$, $S_4$ and $S_5$. The transformed data is stored in further data sources $S_1$ and $S_2$. A reporting process transforms the data from the data sources $S_1$ and $S_2$ into a target report 5.

Example rules and constraints 6-8 are shown in FIG. 1 for each of the levels in the scenario. Errors which produce dirty data in the target report 5 can be introduced either during the transformations at any of the levels or from any of the data sources.

It has been proposed to clean data in the target report 5 by implementing an algorithm which identifies and corrects the errors. The problem with this system is that the algorithm must be retrained if there is a change in one of the data sources or in one of the transformations in the multi-level scenario. This is undesirable since it can be time consuming and costly to retrain a data cleaning algorithm every time there is a change in the system.

An embodiment of the invention seeks to alleviate at least the problems discussed above.

According to one aspect of the present invention, there is provided a system for checking data for errors, the system comprising: a checking module operable to check tuples of data stored in a target database for errors, the tuples in the target database originating from the output of at least one query transformation module which applies a query transformation to tuples of data from at least one data source; an identification module operable to identify a problematic tuple from a data source that produces an error in the target database, the identification module being operable to quantify the contribution of the problematic tuple in producing the error in the target database, and a description generation module operable to generate a descriptive query which represents at least one of: errors identified by the checking module in the target database which are produced by the at least one query transformation module, and problematic tuples identified in a data source by the identification module.

Preferably, the system further comprises: a correction module which is operable to use the descriptive query to modify at least one of: the at least one query transformation module to correct an error produced by the at least one query transformation module; and a data source to correct problematic tuples in the data source.

Conveniently, the descriptive query comprises lineage data which indicates at least one of a query transformation module producing the error and a data source comprising a problematic tuple.

Advantageously, the system further comprises the at least one transformation module and the at least one transformation module is operable to modify the transformation applied by the transformation module so that the transformation module does not produce an error in the target database.

Preferably, the checking module is operable to receive at least one quality rule and to check the data stored in the target database to detect if the data violates each quality rule, and wherein the system further comprises a violations storage module which is operable to store data that violates at least one of the quality rules in a violation table.

Conveniently, the checking module is operable to identify at least one attribute in a tuple of data stored in the violation table that violates at least one of the quality rules, and to identify the data source from which the attribute originated.

Advantageously, the system further comprises a processing module which is operable to process the data stored in the violations table to identify an error value for at least one attribute in the violations table, the error value indicating the probability of the attribute violating a quality rule.

Preferably, the system further comprises a query module which is operable to provide at least one query to the target database and to record the number of clean and erroneous tuples of data that are returned by the at least one query.

Conveniently, the processing module is operable to store an annotation associated with the record of each tuple of data stored in the violations table with a weight value indicating the probability of the tuple violating a quality rule in response to a query to the target database.

Advantageously, the system further comprises a contribution score vector calculation module operable to calculate a contribution score vector indicating the probability of a tuple of data causing an error, and wherein the processing module is operable to annotate the record of each tuple of data stored in the violations table with the calculated contribution score vector.

Preferably, the system further comprises a removal score vector calculation module operable to calculate a removal score vector which indicates if a violation can be removed by removing a tuple of data from a data source.

Conveniently, the system further comprises a distance calculation module operable to calculate the relative distance between the tuples in the data entries stored in the violations table that have a contribution score vector or a removal score vector above a predetermined threshold.

In another aspect of the present invention, there is provided a computer implemented method for checking data for errors, the method comprising: checking tuples of data stored in a target database for errors, the tuples in the target database originating from the output of at least one query transformation module which applies a query transformation to tuples of data from at least one data source; identifying a problematic tuple from a data source that produces an error in the target database and quantifying the contribution of the problematic tuple in producing the error in the target database, and generating a descriptive query which represents at least one of: errors identified by the checking step in the target database which are produced by the at least one query transformation module, and problematic tuples identified in a data source by the identification step Preferably, the method further comprises using the descriptive query to modify at least one of: the at least one query transformation module to correct an error produced by the at least one query transformation module; and a data source to correct problematic tuples in the data source.

Conveniently, the descriptive query comprises lineage data which indicates at least one of a query transformation module producing the error and a data source comprising a problematic tuple.

Advantageously, the method further comprises modifying the transformation applied by the transformation module so that the transformation module does not produce an error in the target database.

Preferably, the checking step comprises: providing at least one quality rule; checking the data stored in the target database to detect if the data violates each quality rule; and storing the data that violates at least one of the quality rules in a violation table.

Advantageously, the method further comprises: identifying at least one attribute in a tuple of data stored in the violation table that violates at least one of the quality rules; and identifying the data source from which the attribute originated.

Conveniently, the method further comprises: processing the data stored in the violations table to identify an error value for at least one attribute in the violations table, the error value indicating the probability of the attribute violating a quality rule.

Preferably, the method further comprises: providing at least one query to the target database and recording the number of clean and erroneous tuples of data that are returned by the at least one query.

Advantageously, the method further comprises annotating the record of each tuple of data stored in the violations table with a weight value indicating the likelihood of the tuple violating a quality rule in response to a query to the target database.

Conveniently, the method further comprises calculating a contribution score vector indicating the probability of a tuple of data causing an error and annotating the record of each tuple of data stored in the violations table with the calculated contribution score vector.

Preferably, the method further comprises computing a removal score vector which indicates if a violation can be removed by removing a tuple of data from a data source.

Advantageously, the method further comprises determining the relative distance between the tuples in the data entries stored in the violations table that have a contribution score vector or a removal score vector above a predetermined threshold.

According to another aspect of the present invention, there is provided a tangible computer readable medium storing instructions which, when executed, cause a computer to perform the method of any one of claims 12 to 21 defined hereinafter.

Figure 3:
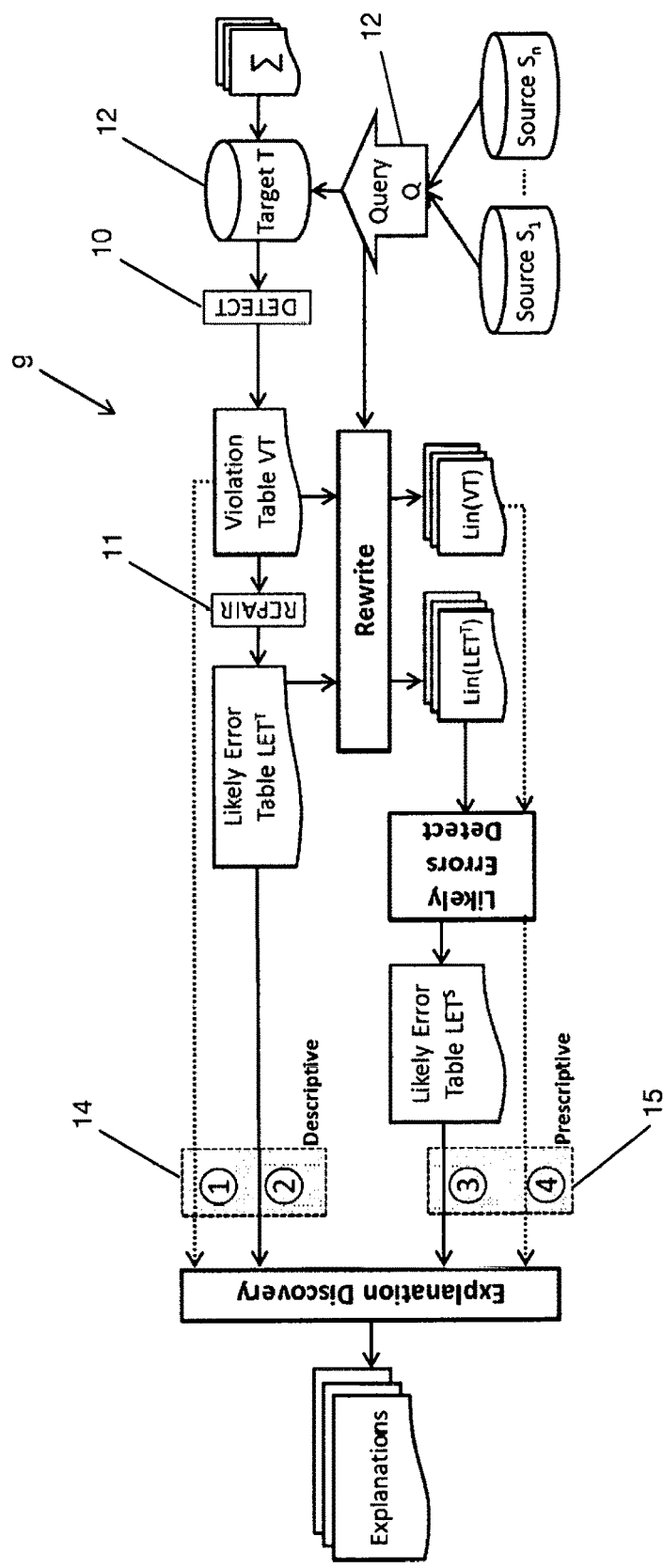
Figure 6:
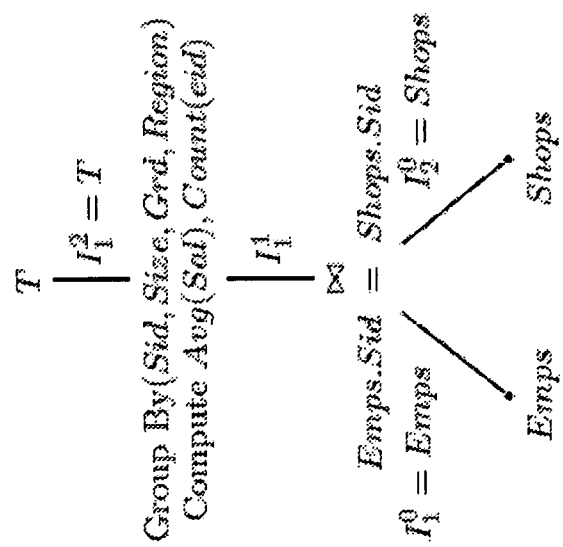

So that the present invention may be more readily understood, embodiments of the present invention will now be described, by way of example, with reference to the accompanying drawings, in which:

FIG. 1 is a schematic diagram showing an example of a general multi-level scenario comprising multiple transformations and multiple data sources, FIG. 2 is an extract from a report T on data sources Emps and Shops, FIG. 3 is a schematic diagram of an embodiment of the invention, FIG. 4 shows example data showing the average hours for each Shop, FIG. 5 shows example data with procedure 1 applied on an intermediate source 1, FIG. 6 shows an example of a query tree, FIG. 7 shows data with procedures 1 and 2 applied on Emps, FIG. 8 shows example data with procedures 1 and 2 applied on Shops, and FIGS. 9 (a-l) are graphs illustrating the experimental results for an output for all embodiment of the invention.

A system and method for cleaning data of an embodiment of the invention will now be described with reference to the example data shown in the reports T in FIG. 2 of the accompanying drawings.

The method of an embodiment of the present invention is preferably a computer implemented method. A computer is operable to perform the steps of the method using computer hardware that is known to those skilled in the art. The method may be implemented on at least one computer which may be connected within a computer network, such as the Internet. Embodiments of the invention also extend to systems comprising hardware which is operable to implement the method.

The steps of the method are, in one embodiment, stored on a tangible computer readable medium. The computer readable medium is configured to be read by a computer which is operable to perform the steps of the method.

EXAMPLE 1

Consider the report T shown in FIG. 2 of the accompanying drawings which includes example data about shops for an international franchise. The human resources department enforces a set of policies in the franchise workforce and identifies two problems in T. The first violation ($t_a$ and $t_b$ in bold) comes from a rule stating that, in the same shop, the average salary of the managers (Grd=2) should be higher than the one of the staff (Grd=1). The second violation ($t_b$ and $t_d$, in italic) comes from a rule stating that a bigger shop cannot have a smaller staff.

To explain these errors, we adopt an approach that summarizes the violations in terms of predicates on the database schema. In the example, since the problematic tuples have an Attribute Region set to US, we describe (explain) the violations in the example as [T.Region=US]. Note that the explanation [T.Region=US] summarizes all tuples that are involved in a violation, and not necessarily the erroneous tuples; in many cases, updating only one tuple in a violation (set of tuple) is enough to bring the database into a consistent state.

For example, a repairing algorithm would identify $t_b$.Grd as a possible error in the report. Hence, by updating $t_b$.Grd the two violations would be removed. Limiting the erroneous tuples can guide us to a more precise explanation of the errors. In the example, the explanation [T.Region=US ∧ T.ship=NY1] is a more specific explanation, if we indeed believe that $t_b$.Grd is the erroneous cell. The process of explaining data errors is indeed two-fold: identifying a set of potential erroneous tuples (cells); and finding concise description that summarize these errors and can be consumed by users or other analytics layers.

We highlight the problem of explaining errors when errors are identified in a different space and at a later stage than when errors were digitally born. Consider the following query that generated Table T in Example 1. Since violations detected in the report are actually caused by errors that crept in at an earlier stage, i.e., from the sources, propagating these errors from a higher level in the transformation to the underlying sources can help in identifying the source of the errors and in prescribing actions to correct them.

EXAMPLE 2

Let us further assume that the previous report T is the result of a union of queries over multiple shops of the same franchise. We focus on the query over source relations Emps and Shops for the US region (FIG. 2).
Q: SELECT SId as Shop, Size, Grd, AVG(Sal) as
AvgSal, COUNT(EId) as #Emps, 'US' as Region
FROM US.Emps JOIN US.Shops ON SId
GROUP BY SId, Size, Grd We want to trace back the tuples that contributed to the problems in the target. Tuples $t_a$-$t_d$ are in violation in T and their lineage is $\{t_1$-$t_8\}$ and $\{t_{11}$-$t_{12}\}$ over Tables Emps and Shops. By removing these tuples from any of the sources, the violation is removed. Two possible explanations of the problems are therefore [Emps.JoinYr=2012] On Table Emps, and on [Shops.State=NY] on Table Shops.

As we mentioned earlier, $t_b$ is the erroneous tuple that was identified by the repairing algorithm. Its lineage is $\{t_1,t_3,t_4\}$ and $\{t_{11}\}$ over Tables Emps and Shops, respectively. By focusing on this tuple, we can compute more precise explanations on the sources, such as [Emps.Dept=S] Drilling down even further, an analysis on the lineage of $t_b$ may identify $t_4$ as the most likely source of error since by removing $t_4$, the average salary goes down enough to clear the violation. For example, outlier detection systems can perform such analysis. Therefore, the most precise explanation is [Emps.EId=e8] The example shows that computing likely errors enables the discovery of better explanations. At the source level, this leads to the identification of actions to solve the problem. In the example, the employee with id e8 seems to be the cause of the problem.

Referring now to FIG. 3 of the accompanying drawings, we now describe a computer implemented system 9 of an embodiment of the invention which provides a database Prescription (DBRx for short) system and method for descriptive and prescriptive data cleaning. DBRx takes quality rules defined over the output of a transformation and computes explanations of the errors.

The system 9 comprises a checking module which incorporates a detection unit 10 and a repair unit 11. The checking module is operable to check tuples of data stored in a target database 12 for errors. The tuples in the target database 12 originate from the output of at least one query transformation module 13 which applies a query transformation to tuples of data from at least one data source $S_1$-$S_n$.

Given a transformation scenario (sources $S_i$, 1<i<n, and query Q) and a set of quality rules Σ, the detection unit 10 of the DBRx system 9 computes a violation table VT of tuples not complying with Σ1. The violation table VT is stored by a violations storage module. VT is mined by a processing module to discover a descriptive explanation 14 (1) in FIG. 3 such as [T.Region=US]. The lineage of the violation table over the sources enables the computation of a prescriptive explanation 15 (4) such as [Emps.JoinYr=2012] and [Shops.State=NY] on the source tables. When applicable, a repair is computed over the target 12, thus allowing the possibility of a more precise description 14 (2) such as [T.Region=US∧ T.Shop=NY1], and a more precise prescriptive explanation 15 (3) based on propagating errors to the sources such as [Emps.Dept=S] and [Emps.EId=e8]. The system 9 comprises a description generation module which is operable to generate a descriptive query which represents at least one of: errors identified by the checking module 10, 11 in the target database 12 which are produced by the at least one query transformation module 13; and problematic tuples identified in a data source $S_1$-$S_n$ by an identification module.

Building DBRx raises several technical challenges: First, propagating the evidence about violating tuples from the target to the sources can lead to a lineage that covers a large number of source tuples. For example, an aggregate query would clump together several source tuples, but only few of them contain actual errors. For instance, a violation on an aggregate in the target data is caused because of errors in some of the source aggregated tuples; all source tuples are not equally responsible. Simply partitioning the source tuples as dirty and clean is insufficient, as tuples do not contribute to violations in equal measure. Second, we need a mechanism to accumulate evidence on tuples across multiple constraints and violations to identify the most likely tuples to contain errors. For the target side, there may be several data repair algorithms that we can rely on. But for the source side, a new algorithm is needed, in lieu of the previous challenge. Third, after identifying the likely errors, mining the explanations involves two issues that we need to deal with: (1) what are the explanations that accurately cover all and only the identified erroneous tuples?; and (2) how to generate explanations concise enough in order to be consumable by humans?

The technical contribution of embodiments of the invention is described below as follows:
 a. We introduce the problem of descriptive and prescriptive data cleaning (Section 2). We define the notion of explanation, and formulate the problem of discovering explanations over the annotated evidence of errors at the sources (Section 3).
 b. We develop a novel and technical weight-based approach to annotate the lineage of target violations in source tuples (Section 4).
 c. We present an algorithm to compute the most likely errors in presence of violations that involve large number of tuples with multiple errors (Section 5).
 d. We combine multi-dimensional mining techniques with approximation algorithms to efficiently solve the explanation mining problem (Section 6).
 e. We perform an extensive experimental analysis using the TPC-H Benchmark (Section 7).

2 PROBLEM STATEMENT

Let S=$\{S_1, S_2, \ldots, S_n\}$ be the set of schemas of n source relations, where each source schema $S_i$ has $d_i$ attributes $A_1^{S_i}, \ldots, A_{d_i}^{S_i}$ with domains dom($A_1^{S_i}$), dom($A_{d_i}^{S_i}$) Let R be the schema of a target view generated from S. Without loss of generality, we assume that every schema has a special attribute representing the tuple id. A transformation is a union of SPJA queries on an instance I of S that produces a unique instance T of R with t attributes $A_1^T, \ldots, A_t^T$.

Any instance T of a target view is required to comply with a set of data quality rules $\Sigma$. We clarify the rules supported in our system in the next Section. For now, we characterize them with the two following functions:

Detect(T) identifies cells in T that do not satisfy a rule $r \in \Sigma$, and store them in a violation table V(T).

Error (V(T)) returns the most likely erroneous tuples for the violations in V(T) and store them in an error table E(T).

While DETECT has a clear semantics, ERROR needs some clarifications. At the target side, we consider the most likely erroneous cells as simply those cells that a given repair algorithm decides to update in order to produce a clean data instance, i.e., an instance that is consistent w.r.t. the input rules. Our approach can use any of the available alternative repair algorithms (Section 3.3 below). At the source, we need to deal with the lineage of problematic cells instead of the problematic cells themselves, to produce the most likely erroneous cells. Existing repair algorithms were not meant to handle such a scenario; we show in Section 5 our own approach to produce these cells.

Our goal is to describe problematic data with concise explanations. Explanations are composed of queries over the relations in the database as follows.

Definition 1 An explanation is a set E of conjunctive queries where $e \in E$ is a query of k selection predicates $(A_{l_1}^{S_i} = v_{l_1}) \wedge \ldots \wedge (A_{l_k}^{S_i} = v_{l_k})$ over a table $S_i$ with $d_i$ attributes, $1 \leq k \leq d_i$, and $v_{l_j}$ ($1 \leq j \leq k$) are constant values from the domain of the corresponding attributes. We denote with size (E) the number of queries in E.

We assume that the most likely erroneous tuples (or erroneous tuples, for short, when there is no ambiguity) in a relation are given in E(T). There are three requirements for an explanation: (i) coverage—covers most of the erroneous tuples, (ii) conciseness—has a small number of queries, and (iii) accuracy—covers mostly erroneous tuples.

EXAMPLE 3

Consider again relation Emps from the running example. Let us assume that $t_1, t_3, t_4$, and $t_7$ are erroneous tuples. There are alternative explanations that cover these errors. The most concise is $exp_7$:(Emps.Grd=1), but one clean tuple is also covered ($t_5$). Explanation $exp_8$:(Emps.eid=$e_4$) $\vee$ (Emps.eid=$e_7$) $\vee$ (Emps.eid=$e_8$) $\vee$ (Emps.eid=$e_{14}$) has a larger size, but it is more accurate since no clean tuples are covered.

We define cover of a query e the set of tuples retrieved by e. The cover of an explanation E is the union of cover $(q_1), \ldots,$ cover$(q_n)$, $q_i \in E$ For a relation R having a violation table V(R) computed with Detect, we denote with C the clean tuples R\ Error (V(R)). We now state the exact descriptive and prescriptive data cleaning (DPDC) problem:

Definition 2 (Exact DPDC) Given a relation R, a corresponding violation table V(R), and an Error function for V(R), a solution for the exact DPDC problem is an explanation $E_{opt}$ s.t.

$$E_{opt} = \underset{size(E)}{\operatorname{argmin}}(E \mid (cover(E) = E(R)))$$

If function Error is not available (1), the problem is defined on V(R) instead of E(R).

Unfortunately, the solution for the exact problem may not exist in some cases and may not be useful in other cases. Since all errors must be covered and no clean tuples are allowed in the cover, the exact solution in the worst case does not exist. In other cases, it may be a set of queries s.t. each query covers exactly one tuple. Hence, the number of queries in the explanation equals the number of errors (as in $exp_8$), thus making the explanation hard to consume for end users.

To allow more flexibility in the explanation discovery, we drop the strict requirement over the precision of the solution allowing it to cover some clean tuples. We argue that explanations such as $exp_7$ can highlight better problems over the sources and are easier to consume for humans. More specifically, we introduce a weight function for a query q, namely w(q), that depends on the number of clean and erroneous tuples that it covers:

$$w(q) = |E(R) \backslash cover(q)| + \lambda * |cover(q) \cap C|$$

where w(E) is the sum $w(q_1) + \ldots + w(q_n)$ $q_i \in E$ that we want to minimise and the constant $\lambda$ has a value in [0,1]. The role of the weight function is twofold. First, it favors queries that cover many errors (first part of the weight function) to minimize the number of queries to obtain full coverage in E. Second, it favors queries that cover few clean tuples (second part). Constant $\lambda$ weighs the relative importance of clean tuples w.r.t. errors. In fact, if clean and erroneous tuples are weighted equally, selective queries with $|cover(q) \cap C| = \emptyset$ are favored, since they are more precise, but they lead to larger size for E. On the contrary, obtaining a smaller sized explanation justifies the compromise of covering some clean tuples. In other words, covering the errors is more important than not covering the clean tuples. We set the parameter $\lambda$ to the error rate for the scenario, we shall describe in Section 6 how it is computed. We can now state the relaxed version of the problem.

Definition 3 (Relaxed DPDC) Given a relation R, a corresponding violation table V(R), an Error function for V(R), a solution for the relaxed DPDC problem is an explanation $E_{opt}$, s.t.

$$E_{opt} = \underset{w(E)}{\operatorname{argmin}}(cover(E) \supseteq E(R))$$

When the DPDC problem is solved over the target (resp. sources), it computes descriptive (resp. prescriptive) explanations. We can identify a mapping of this problem with the well-known weighted set cover problem, which is proven to be an NP-Complete problem [5], where the universe are the errors in E(R) and the sets are all the possible queries over R.

3 VIOLATIONS AND ERRORS

While many solutions are available for the standard data cleaning setting, i.e., a database with a set of constraints, we show in this section how the two levels in our framework, namely target and sources, make the problem much harder.

3.1 Data Quality Rules

Quality rules can be usually expressed either using known formalisms or more generally through arbitrary code (either declarative or procedural). We thus distinguish between two classes of quality rules over relational databases. The first class will be treated as a white box in the evidence propagation to sources while the second will be treated as a black box.

Examples for the first class are functional dependencies (FDs), conditional functional dependencies (CFDs), and check constraints (CCs). Since rules in these formalisms can be expressed as denial constraints (DCs), we will refer to this language in the following and denote such rules with $\Sigma^D$. Our repair model focuses on detecting problems on the existing data with the big portion of business rules supported by DCs. However, more complex repair models for missing tuples can be supported with extensions.

Consider a set of finite built-in operators $B=\{=,<,>,\neq,\leq,\geq\}$. B is negation closed, such that we could define the inverse of operator $\phi$ as $\bar\phi$. A DC in our notation has the form $$\varphi: \forall t_\alpha, t_\beta, t_\gamma \ldots \in R, \neg(P_1 \wedge \ldots \wedge P_m)$$

where $P_i$ is of the form $v_1 \phi v_2$ or $v_1 \phi \text{const}$ with $v_1$, $v_2$ of the form $t_x.A$, $x \in \{\alpha, \beta, \gamma, \ldots\}$, $A \in R$ and const is a constant. For simplicity, we use DCs with only one relation S in S, but there is no such limitation in general.

EXAMPLE 4

The rules in the running example correspond to the following DCs (for simplicity we omit the universal quantifiers):

$c_1$: $\neg(t_\alpha.\text{shop}=t_\beta.\text{shop} \wedge t_\alpha.\text{avgsal}>t_\beta.\text{avgsal} \wedge t_\alpha.\text{grd}<t_\beta.\text{grd})$ $c_2$: $\neg(t_\alpha.\text{size}>t_\beta.\text{size} \wedge t_\alpha.\#\text{emps}<t_\beta.\#\text{emps})$ The second class includes data validation and check rules expressed with arbitrary declarative languages (such as SQL) and procedural code (such as Java programs). These are specification alternatives to the traditional rules in $\Sigma^D$. We denote these more general rules with $\Sigma^P$. Thus, $\Sigma = \Sigma^D \cup \Sigma^P$.

EXAMPLE 5

A rule expressed in Java could for example pass to an external web service attributes Size, #Emps and Region to validate if the ratio of the size of the staff and the size of the shop comply with a policy in some legislations of a given country.

3.2 Target Violation Detection

Given a set of rules $\Sigma$, we require that any rule $r \in \Sigma$ has to provide a function detect that identifies groups of cells (or tuples) that together do not satisfy r. We call a set of cells that together violate a rule in the data a violation. We collect all such violations over T w.r.t. $\Sigma$ in a violation table with the schema (vid,r,tid,att,val), where vid represents the violation id, r is the rule, tid is the tuple id, att is the attribute name of the cell, and val is the value tid.att of that cell. We denote the violation table of a target view T as V(T).

For DCs in $\Sigma^D$, detect can be easily obtained. A DC states that all the predicates cannot be true at the same time, otherwise, we have a violation. Given a database instance I of schema S and a DC $\varphi$, if I satisfies $\varphi$, we write I⊨$\varphi$, and we say that $\varphi$ is a valid DC. If we have a sot of DC $\Sigma$, I⊨$\Sigma$ if and only if $\forall \varphi \in \Sigma$, I⊨$\varphi$.

For rules in $\Sigma^P$, the output emitted by the arbitrary code when applied on the data can be used to extract the output required by detect. In the above example, in case of non compliance with the policy for a given tuple, the cells Size, #Emps and Region will be considered as one violation.

3.3 Target Errors Detection

As we mentioned in the introduction (Example 2), the ability to identify actual errors can improve the performance of the system. However, computing the errors is a hard task to achieve. We can rely on the literature on data repairing as a tool to identify the errors in a database. If a cell needs to be changed to make the instance consistent, then that cell is considered as an error.

Repair computation refers to the process of correcting the violations detected in the data. Several algorithms have been proposed for repairing inconsistent data, and most of these focus on declarative data quality rules (such as those in $\Sigma^D$). In fact, these rules naturally have a static semantics for violations detection (as described above) and a dynamic semantics to remove them. This can be modeled with a repair function. Given a violation for a certain rule, the repair function lists all the possible changes to the cells in the database to satisfy the dependency. In other terms, the function takes as input the violation table and identifies alternative subsets of cells to be changed in order to solve the violation identified by the corresponding detect.

For rules in $\Sigma^P$, the repair function must be provided. If such a function cannot be provided (as in many cases), our explanations will be limited to violations and their lineage (1 and 4 in FIG. 3). For rules in $\Sigma^D$, computing the repair functions is straightforward: given a DC, the repair function is the union of the inverse for each predicate in it.

EXAMPLE 6

Given the rules in the running example, their repair functions are the following:
repair($c_1$): $(t_\alpha.\text{shop} \neq t_\beta.\text{shop}) \vee (t_\alpha.\text{avgsal} \leq t_\beta.\text{avgsal}) \vee (t_\alpha.\text{grd} \geq t_\beta.\text{grd})$
repair ($c_2$): $(t_\alpha.\text{size} \leq t_\beta.\text{size}) \vee (t_\alpha.\#\text{emps} \geq t_\beta.\#\text{emps})$ It is known that the repair problem (even in the simplest setting of FDs only) has NP complexity. However, heuristic algorithms to compute automatic repairs in polynomial time have been proposed. Such algorithms try to identify the minimal number of cells to be changed to obtain a new instance conforming with the rules. More precisely, for a violation table V(T) and the repair functions $F=f_1, \ldots, f_n$ for all rules in $\Sigma$, a Repair(V(T), F) algorithm computes a set of cell updates on the database s.t. it satisfies $\Sigma$. While we are not interested in the actual updates to get a repair, we consider the cells to be updated by the repair algorithm to be the likely errors.

3.4 From Target to Sources

We have introduced how violations and errors can be detected over the target. Unfortunately, a target rule can be rewritten at the sources only in limited cases. This is not possible for the rules expressed as Java code in $\Sigma^P$ as we treat them as black-boxes. For rules in $\Sigma^D$, the rewriting depends on the SQL script in the transformation. Rules may involve target attributes whose lineage is spread across multiple relations (as in Example 1), thus the transformation is needed in order to apply them. An alternative approach is to propagate the violations from the target to source at the instance level. However, the going from the target to the sources introduces new challenges.

EXAMPLE 7

Given a source relation Shifts and a target relation T (FIG. 4) obtained using the following query:
SELECT SId as Shop, AVG(Hours) as avgHours
FROM Sales where SID like 'NY %'
GROUP BY SId We consider the check constraint $\neg$(avgHours<25) over T, tuple $t_a$ is a violation in T. We notice that by removing its lineage ($t_1$-$t_7$), the violation is removed. However, we are interested in identifying most likely errors and considering the entire lineage may not be necessary. In fact, it is possible to remove the violation by just removing a subgroup of the lineage. In particular, all the subsets of size between 1 and 4 involving $t_1$, $t_2$, $t_5$, $t_6$, $t_7$ are possible alternative subgroups, whose removal removes the violation on $t_a$.

It is easy to see that the lineage of the violation leads to the problematic tuples over the source. Computing a repair on the source requires a new repair algorithm such that by updating some source tuples, the results of the query change and satisfy the constraints. This is always possible, for example by removing the entire lineage. However, similarly to the target level, the traditional concept of minimality can still guide the process of identifying the source tuples that need to change. There are two motivations for this choice.

On the one hand, treating the entire lineage as errors is far from the reality for a query involving a large number of tuples. On the other hand, considering the entire lineage in the explanation discovery makes it to find very hard, if not impossible, to find meaningful explanations. Unfortunately, it is known that computing all the possible subsets of such lineage is a NP problem even in simpler settings with one SPJU query. We can easily see from the example how the number of subsets can explode.

The above problem leads to the impossibility of computing a minimal repair over the sources. Furthermore, we are interested in the erroneous tuples in order to discover explanations, not in computing a repair. This implies that the module in charge of computing the errors will use the minimality principle, but is not required to compute a target repair. In the next two sections, we introduce scoring functions to quantify the importance of source cells and tuples w.r.t. violations (Section 4) and then use these scores in a new algorithm that returns the most likely erroneous source cells (Section 5).

4 EVIDENCE PROPAGATION OVER SOURCES

The evidence propagation module involves two tasks: (1) The first task is to trace the lineage of tuples in violations at the target to source tuples. To this end, we implemented inverse query transformation techniques. (2) The second task is to determine how to propagate violations as evidence over the source. For the latter task, we introduce two scores, namely removal and contribution scores, to quantify the effect of source tuples and source cells in the lineage of each violation. These scores will allow the computation of the likely errors over the source (Section 5).

For each tuple in a violation in the target T, only a few cells from that tuple are usually involved in the violation. We denote such cells as problematic cells. These cells are in turn computed from some source cells (in some source tuples), also labeled as problematic.

Given a violation v, the contribution score measures how much the value in each problematic source cell contributes to v. For a violation v, not all problematic source cells contribute to v in equal measure, and not all corresponding source tuples have the same effect on the violation if removed from the database. We illustrate these statements with an example and then give the formal definition.

Cells Contribution.

Given a violation v, we want to measure how much the value in each problematic source cell contributes to v. In fact, not all problematic source cells contribute equally to v.

EXAMPLE 8

For the problematic tuples $t_a$ and $t_b$ (Example 1), problematic cells are $t_a$.Shop, $t_a$.Grd, $t_a$.AvgSal and $t_b$.Shop, $t_b$.Grd, $t_b$.AvgSal. These are in turn computed from $t_{12}$.Sid, $t_1$-$t_4$.Grd, and $t_1$-$t_4$.Sal.

A violation is triggered because $t_b$.AvgSal>$t_a$.AvgSal. Tuple $t_b$.AvgSal is computed from $t_1$.Sal, $t_3$.Sal and $t_4$.Sal. Among them, a high value of $t_4$.Sal is a more likely cause for the violation than $t_1$.Sal or $t_3$.Sal.

Tuples Removal.

Wrongly jointed tuples can trigger an extra tuple in the result of a query, thus causing a violation in the target. We want to measure how much removing a problematic source tuple removes v.

There are other possible causes to consider. Wrongly joined tuples can trigger an extra tuple in the result of a query, thus causing a violation in the target. The removal score measures how much removing a problematic source tuple removes v. We illustrate this point with an example and then give the formal definition.

EXAMPLE 9

Let us assume that the correct value for $t_1$.SId is a different shop from NY1, say NY2. Erasing $t_1$ removes the violation for $c_2$ (the two stores would have the same number of employees), even though NY1 as a value is not involved in the violation.

We derive from sensitivity analysis our definitions of contribution and removal scores. The intuition is that we want to compute the sensitivity of a model to its input. In general, given a function, the influence is defined by how much the output changes given a change in one of the input variables. In one embodiment, the models are the operators in the SQL query, which take a set of source tuples as input and output the problematic tuples in the view.

Definition 4

A contribution score $cs_v(c)$ of a problematic source cell c w.r.t. a target violation v is defined as the difference between the original result and the updated output after removing c divided by the number of cells that satisfy the SQL operator.

A removal score $rs_v(t)$ of a problematic source tuple t w.r.t. a target violation v is 1 if by removing c, v is removed, 0 otherwise.

A score vector CSV of a cell contribution scores (RSV of a tuple for removal scores) is a vector $[cs_1, \ldots, cs_m]$ ($[rs_1, \ldots cs_m]$), where m is the number of violations and $cs_1, \ldots, cs_m \in \mathbb{R}$ ($rs_1, \ldots, rs_m \in \mathbb{B}$). If a problematic cell or tuple does not contribute to a certain violation, we put an empty field in the vector. We will omit the subscript if there is no confusion.

Definition 5

A removal score vector (RSV) of a tuple s of some source relation S is a vector $[rs_1, \ldots, rs_m]$, where m is the number of violations and $rs_1 \ldots, rs_m \in R$.

If a problematic cell or tuple does not contribute to a certain violation, we put an empty field ' ' in the vector. Given a violation v, we denote the contribution score of a cell c, resp. tuple s as $cs_v(s)$, resp. $cs_v(s)$, and the removal score of a tuple s as $rs_v(s)$ We also denote score vectors as $cs_v(c)$ $cs_V(s)$, and $rs_v(s)$, resp. We will omit the subscript 'v' whenever there is no confusion.

We assume that the underlying transformation belongs to the SPJAU class of queries. We compute CSVs and RSVs with the help of the operator tree of the query. For an SPJAU query, every node in the tree is one of the following five operators: (1) selection (S), (2) projection (P), (3) join (J), (4) aggregation (A), and (5) union (U).

EXAMPLE 10

FIG. 6 shows the query tree for our running example. It has three operators: (1) the ⋈ operator, (2) the aggregation operator with the group by, and (3) the projection on columns Sid, Size, Grd Region, Sal, and Eid (not shown in the figure for the sake of space).

4.1 Computing CSVs

We compute CSVs for cells in a top-down fashion over the operator tree. Each leaf of the tree is a problematic source tuple consisting of a set of cells, with the problematic ones annotated with a CSV.

Let $v$ be a violation in $V(T)$ on a rule $r \in \Sigma$. Let $I^l$ be an intermediate result relation computed by an operator $O^l \in \{S, P, J, A, U\}$ at level $l$ of the tree, whose input is a non-empty set of intermediate source relations $Inp(O^l) = I_1^{l-1}, I_2^{l-1}, \ldots$. In our rewriting, we compute the scores for problematic cells of $Inp(O^l)$ from the cell scores of $I^l$.

Let $c^l$ be a problematic cell in $I^l$, $cs(c^l)$ its contribution score, $val(c^l)$ its value, and $Lin(c^l, I^{l-1})$ its lineage over $I^{l-1}$. Based on the set semantics of relational algebra, Procedure 1 computes the contribution scores of intermediate cells.

Procedure 1 (Intermediate Cell CS): Let $I_k^{l-1}$ be an intermediate relation contributing to cell $c^l$. We initialize the cs score of each problematic cell in target T to We have two cases for computing $cs(c^{l-1})$, $c^{l-1} \in Lin(c^l, I_k^{l-1})$:

1. If $O^l = A$ ($c^l$ is an aggregate cell) and $r \in \Sigma^D$, then $cs(c^{l-1})$ depends on the aggregate operator op and on the constraint predicate $P \in r$ being violated, P: $val(ci^l) \phi val(c_0^l)$ with $\phi \in \{<, \leq, \leq, \geq\}$:
   if op $\in \{avg, sum\}$, then $cs(c^{l-1})$ is $$\frac{val(c^{l-1})}{\sum val(g_i), g_i \in Lin(c^l, I^{l-1})}$$

if $\phi \in \{<, \leq\}$, and $$cs(c^l) \cdot \left(1 - \frac{val(c^{l-1})}{\sum val(g_i), g_i \in Lin(c^l, I^{l-1})}\right)$$

if $\phi \in \{>, \geq\}$;
if op $\in \{max, min\}$, let $Lin \neg^P(c^l, I_k^{l-1}) \subseteq Lin(c^l, I_k^{l-1})$ be the subset of cells that violate P, $cs(c^{l-1})$ is $$\frac{1}{|Lin \neg^P(c^l, I_k^{l-1})|}$$

for $c^{l-1} \in Lin \neg^P(c^l, I_k^{l-1})$ and 0 for all other cells.

2. else, $cs(c^{l-1})$ is $$cs(c^l) \cdot \frac{1}{|Lin(c^l, I_k^{l-1})|}$$

EXAMPLE 11

FIG. 5 reports the CSVs of problematic cells in the intermediate relation $I_1^l$. These are computed by rewriting $I_1^2$, which is T, as shown in FIG. 5. For example, $t_b.Grd$ is computed from cells $i_1^l.Grd$, $i_3^l.Grd$, and $i_4^l.Grd$. By case (b) these cells get a score of ⅓.

Similarly, $t_b.AvgSal$ is aggregated from $i_1^l.Sal$, $i_3^l.Sal$, and $i_4^l.Sal$, and $t_a.AvgSal$ from $i_2^l.Sal$. By case (a) the scores of $i_1^l.Sal$, $i_2^l.Sal$, $i_3^l.Sal$ and $i_4^l.Sal$ are based on the values of the cells, as shown in Figure. 5. Score of $i_2^l.Sal$ is computed as 0 using the first part of case (a).

Procedure 1 has two cases depending on the query operators and $\Sigma$. In case (a), where an aggregate is involved in a violation because of the operator of a rule, we have additional information with regards to the role of source cells in a violation. In case (b), which involves only SPJU operators where the source values are not changed in the target, we distribute the scores of the problematic cells uniformly across the contributing cells. Notice that case (a) applies for $\Sigma^P$ only, since the actual test done in $\Sigma^D$ is not known. However, case (b) applies for both families of rules.

An intermediate source cell can be in the lineage of several intermediate cells marked as problematic. In this case, their cell scores are accumulated by summation following Procedure 2.

Procedure 2 (Intermediate Cell Accumulation):
Let $O^l = O(c^{l-1}, I^l)$ denote the set of all cells computed from cell $c^{l-1} \in I_k^{l-1}$ in the intermediate result relation $I^l$ by operator O, $cs(c^{l-1}) = \Sigma_{c^l \in O} cs(c^{l-1}, c^l)$.

EXAMPLE 12

In FIG. 3, CSVs of $t_{12}.Sid$ for the violation between $t_a$ and $t_b$ are computed from 4 cells in the intermediate relation $I_1^1$ in FIG. 3. Cells $i_1^1.Sid$ $i_3^1.Sid$, $i_4^1.Sid$ have a score of ⅓ and $i_2^1.Sid$ has a score 1. Procedure 2 computes $cs(t_{12}.Sid) = _2$ w.r.t. this violation.

---

Algorithm 1:

---

ComputeCSV(T, V(T), S)
```
 1:    O^T ← Operator that generated T
 2:    h ← Highest level of query tree
 3:    Inp(O^T) ← I_1^{h-1},...,I_{r_h}^{h-1}
 4:    rstate ← (T,O^T,Inp(O^T))
 5:    stateStack←new Stack( )
 6:    stateStack.push(rstate)
 7:    for each violation v ∈ V (T) do
 8:       while !stateStack.empty( ) do
 9:          nextState ← stateStack.top( )
10:          if nextState[1] is T then
11:             pcells ← v^c (T){Problematic cells at T}
12:          else
13:             pcells ← Lin(v^c(T),nextState(1)) {Problematic cells at
   an intermediate relation}
14:          for each cell c ∈ pcells do
15:             computeScores(c,h,nextState)
16:          for each intermediate relation I^{l-1} ∈ nextState[3] do
17:             Apply Procedure 2 on problematic cells of I^{l-1}
18:             O^{l-1} ← operator that generated I^{l-1}
19:             newState ← (I^{l-1},O^{l-1},Ihp(O^{l-1}))
20:             stateStack.push(newState)
21:
22:    function computeScores(Cell c, Vio v, Level l, State nstate )
23:       for each intermediate relation I^{l-1} ∈ nstate[3] do
24:          Apply Procedure 1 on c,nstate[2],I^{l-1}
```

---

Given a target relation T, its violation table V(T) and source relations S Algorithm 1 computes the CSVs of the problematic cells at S. The algorithm defines a state as a triple $(I^l, O^l, Inp(O^l))1$. The triple is referenced using an array notation for simplicity It initializes the root state $(T, O^T, Inp(O^T))$ (line 4), where $O^T$ is the top operator in the tree that computed T. We use a stack to maintain the states.

For each violation v and for each problematic cell c, we first compute the scores of problematic cells (lineage of c) in all relations in Inp($O^T$) (Lines 10-13) by an application of Procedure 1 (line 24). For each intermediate relation in Inp($O^T$), we apply Procedure 2 to accumulate the cs scores of each problematic cell and compute its final cs score w.r.t. the violation v (Lines 16-17). We then add new states for each relation in Inp($O^T$)) The algorithm computes scores all the way up to source relations until the stack is empty, terminating when all the states generated by the operator tree have been visited. Examples of CSVs of problematic cells are presented in FIGS. 3 and 3.

Once CSVs are computed for cells, we compute them for tuples by summing up the cell scores along the same violation while ignoring values for non contributing cells. Comparing tuples will be needed to identify most likely errors.

4.2 Computing RSVs

In contrast to contribution scores, removal scores are directly computed on tuples and are Boolean in nature. If a violation can be removed by removing a source tuple, independently of the other tuples, then such a source tuple is important. This heuristics allow us to identify minimal subsets of tuples in the lineage of a violation that can solve it by being removed. Instead of computing all subsets, checking for each source tuple allows fast computation. The removal score complements the contribution score; together provide strong evidence to narrow the scope of problematic tuples.

We use a bottom-up algorithm to compute the RSVs. It starts with the source tuples in the lineage of a violation. For each source relation S and for each problematic tuple s∈S, it removes s and the tuples computed from it in the intermediate relations in the path from S to T in the query tree. If the violation is removed, we assign a score 1 to $s_i$, 0 otherwise. RSVs for the source relations in the running example are shown in FIGS. 7 and 8.

5 LIKELY ERRORS DISCOVERY

Using the scores introduced in Section 4, we compute a good approximation for the actual source tuples that caused the violations in the first place. It is easy to see that tuples with high scores stand out as potential errors. The goal is to separate the potential error tuples (with high scores) from non-error tuples (with low scores). A top-k analysis on each violation based on the tuple scores can help us easily separate potential errors. However, there does not exist a k that works for all scenarios. For example, a k for FDs may be different from a k for a check constraint.

To resolve the above issue, we present two approaches that are independent from k. In the first approach, we design a distance based function for the subsets of tuples in a violation to separate tuples with high scores from those with low scores. We present a greedy algorithm, which is quadratic in the number of tuples, to optimize this outlier function. This greedy algorithm is applied once on (the tuples of) each violation to separate error tuples locally. We then compute the union of such tuples from all violations to get the set of most likely error tuples. The second approach assumes that there exists exactly one error tuple in the lineage of each violation. In such case, we can show that the problem of computing most likely errors is NP-Hard by obtaining a polynomial time reduction from the facility location problem which is a known NP-Hard problem. However, there exists a polynomial time log n-approximation algorithm to solve this problem.

5.1 Distance Based Local Error Separation

Definition 6 Let $s_1$ and $s_2$ be two source tuple in the lineage of a violation v, the distance between $s_1$ and $s_2$ is:

$$D(s_1,s_2)=|(cs_v(s_1)-cs_v(s_1))+(rs_v(s_1)-rs_v(s_2))|$$

It is expected that scores of high-scoring tuples cluster around a point, and so does the low-scoring tuples. Two tuples with high scores are expected to have a small distance between them, whereas the distance between a high-scoring tuple and a low-scoring tuple Is expected to be high. Our goal is to obtain an optimal separation between high scoring tuples and low-scoring tuples. For one such separation, let $H_v$ be the set of high-scoring tuples and $L_v$ be the set of low-scoring tuples. If a tuple s from $L_v$ is added to $H_v$ and the sum of pair-wise distances between all tuples of $H_v \cup \{s\}$ increases compared to the sum of their scores, then the separation is said to be unstable. Based on this, we define the following separator function:

EXAMPLE 13

Consider six source tuples for a violation v having scores $\{s_1:0.67, s_2:0.54, s_3:0.47, s_4:0.08, s_5:0.06, s_6:0.05\}$. The sum of pair-wise distances for $H_v=\{s_1, s_2, s_3\}$ is 0.24, while the sum of scores is 1.68, thus $SG(H_v)$=1.44. If we add $s_4$ to Hv, the pair-wise distances of H'$_v$: $\{\{s_1, s_2, s_3, s_4\}$ raises to 1.67 and the sum of scores to 1.76. Clearly, this is not a good separation, and this is reflected by the low gain $SG(H'_v)$= 0.08. Similarly, if we remove $s_3$ from $H_v$ the new SG also decreases to 1.14.

Definition 7 Let Lin(v,S) consists of the lineage tuples of v in S. Let $Lin_v^{sub}$ be a subset of Lin(v,S). We define the separation cost of $Lin_v^{sub}$ as:

$$SC(Lin_v^{sub}) = \sum_{s \in Lin_v^{sub}} (cs_v(s) + rs_v(s)) - \sum_{1 \leq j < |Lin_v^{sub}|} \sum_{j < k \leq |Lin_v^{sub}|} D(s_j, s_k)$$

We define an optimal separator between high-scoring and low-scoring tuples as a subset which maximizes this function. As it is NP-Hard in the number of subsets to obtain an optimal separator, we provide a greedy heuristic to compute such separator. We first order all the tuples in Lin(v,S) in the descending order of $cs_v(s)+rs_v(s)$, s∈Lin(v,S) We then, starting with an empty set, add a tuple from the ordering while computing the separation cost after each addition. If the cost is smaller than the cost computed from the previous addition, we stop. The pseudo-code is shown in Algorithm 2. High-scoring tuples computed from each violation are added to the set of most likely error tuples.

| Algorithm 2 |
|---|
| LocalSeparation(Violation v, Lin(v,S)) |
| 1:     $Lin^O$ (v,S) ← Ordering on Lin(v,S) by $cs_v(s) + rs_v(s)$ |
| 2:     Add next tuple s from $Lin^O$ (v,S) to $Lin^{opt}$ (v,S) |
| 3:     prevCost ← -∞ |
| 4:     currentCost ← 0 |
| 5:     while currentCost > prevCost do |
| 6:         prevCost ← currentCost |
| 7:         currentCost ← SC($Lin^{opt}$ (v,S)∪{s}) |
| 8:         if currentCost < prevCost then |
| 9:             Return $Lin^{opt}$ (v,S) |
| 10:        else |
| 11:            Add next tuple s from $Lin^O$ (v,S) to $Lin^{opt}$ (v,S) |

5.2 Global Error Separation

EXAMPLE 14

Consider two violations $v_1$ and $v_2$, and four source tuples $s_1$-$s_4$. Let the scores of the tuples be $v_1$: ($s_1[0.8]$, $s_2[0.1]$, $s_3[0.1]$), $v_2$: ($s_3[0.5]$. $s_4[0.5]$). Here, $s_1$ is the most likely error tuple for $v_1$ and $s_3$ is the one for $v_2$ as it is the one that contributes most over the two violations.

In this section, we compute the most likely errors by formulating it as an uncapacitated facility location problem. We assume that there exists exactly one error tuple in the lineage of each violation. The uncapacitated facility location problem is described as follows.

1. a set $Q=\{1, \ldots, n\}$ of potential sites for locating facilities,
2. a set $D=\{, \ldots, m\}$ of clients whose demands need to be served by the facilities,
3. a profit $c_{qd}$ for each $q \in Q$ and $d \in D$ made by serving the demand of client d from the facility at q.
4. a non-negative cost $f_q$ for each $q \in Q$ associated with opening the facility at site q.

The objective is to select a subset $Q \subseteq Q$ of sites where to open facilities and to assign each client to exactly one facility s.t the difference of the sum of maximum profit for serving each client and the sum of facility costs is maximized, i.e., $$\underset{Q \subseteq Q}{\operatorname{argmax}}\left(\sum_{d \in D} \max_{q \in Q}(c_{qd}) - \sum_{q \in Q} f_q\right)$$

We obtain a polynomial time reduction from the facility location problem to the problem of computing most likely errors. For each facility site q, we associate a source tuple s in $\cup_{v \in V(T)} \text{Lin}(v,S)$. For each client d, we associate a violation $v \in V(T)$ Let $\text{Lin}(V(T),S) = \cup_{v \in V(T)} \text{Lin}(v,S)$ and $n = |\text{Lin}(V(T),S)|$, and $m = |V(T)|$. For each tuple s in $\text{Lin}(v_j,S)$, we associate the cost $c_{qd}$ with the score $(cs_j(s)+rs_j(s))$. The fixed cost $f_q$ is the cost of covering a source tuple, which we assume to be 1. Clearly, a solution to our problem is optimal if and only if a solution to the facility location problem is optimal. We now present the greedy heuristic for this problem as follows.

We start with an empty set Q of tuples, and at each step we add to Q a tuple $s \in \text{Lin}(V(T),S) \setminus Q$ that yields the maximum improvement in the objective function:

$$f(Q) = \sum_{d \in D} \max_{q \in Q}(c_{qd}) - \sum_{q \in Q} f_q$$

For a tuple $s \in \text{Lin}(V(T),S)) \setminus Q$, let $\Delta_s(Q) = f(Q \cup \{s\}) - f(Q)$ denote the change in the function value. For a violation $v_j$, let $u_j(Q)$ be $$\max_{s \in Q}(cs_j(s) + rs_j(s)),$$

and $u_j(\emptyset)=0$. Let $\delta_{js}(Q)=cs_j(s)+rs_j(s)-u_j(Q)$. Then, we write $\Delta_s(Q)$ as follows:

$$\Delta_s(Q) = f(Q \cup \{s\}) - f(Q)$$

$$= \sum_{v_j \in V(T)} \left(\begin{cases} \delta_{js}(Q) & \text{if } \delta_{js}(Q) > 0 \\ 0 & \text{otherwise} \end{cases}\right) - 1$$

Note that, the −1 corresponds to the cost of each tuple which is 1 in our problem. In each iteration of the greedy heuristic, $\Delta_s(Q)$ is computed for each $s \in \text{Lin}(V(T),S)) \setminus Q$. We add a tuple s whose marginal cost $\Delta_s(Q)$ is maximum. The algorithm terminates if either there are no more tuples to add or if there is no such s with $\Delta_s(Q) > 0$.

The algorithm identifies tuples whose global (cumulative) contributions (to all violations) is significantly higher than others. This global information leads to higher precision compared to the distance based error separation, but to a lower recall if more than one tuple is involved in a violation.

Favor precision w.r.t. to recall is desirable, as it is easier to discover explanations from fewer errors than discover them from a mix of error and clean tuples. This will become evident in the experiments.

6 EXPLANATION DISCOVERY

The problem of explanation discovery pertains to selecting an optimal explanation of the problematic tuples from a large set of candidate queries. Explanations should be concise as they need to capture a summary of the errors to be useful in taking prescriptive actions on source data. We are interested in covering the most likely error tuples in E(R) (as computed by Error on the target or as computed by either of the methods we described in Section 5) while minimizing the number of clean tuples being covered and the size of the explanation.

In the following we describe our two-stage solution to compute the optimal explanation. We first compute candidate queries. We then use a greedy algorithm for the weighted set cover with weights based on the weight function over query q defined in Section 2.

6.1 Candidate Queries Generation

Algorithm 3 generates the candidate queries for a source S with d dimensions. It first generates all queries with single predicate for each attribute $A^l$ (lines 5,6) which cover at least one tuple in E(R). The data structure P[1 . . . d] is used to store the queries of the respective attributes. The algorithm then has a recursive stop in which queries of each attribute ($A^{l_0}$) are expanded in a depth-first manner by doing a conjunction with queries of attributes $A^l \ldots A^d$ where $l = l_0 + 1$ (lines 7-8,10-16). The results of the queries are added to a temporary storage P' and are expanded in the next recursive step.

| Algorithm 3 |
|---|
| CQGen( E(R) , Table R , d ) |
| 1:     P ← { } All candidate queries |
| 2:     P[1..d] ← Holds 1-predicate queries of each attribute |
| 3:     for s ∈ E(R) do |
| 4:         for l ← 1 to d do |
| 5:             Add predicate $A^l = s.A^l$ to P |
| 6:             Add predicate $A^l = s.A^l$ to P[l] |
| 7:     for $l_0$ ← 1 to d − 1 do |
| 8:         CQRecurse(P[$l_0$], $l_0$) |
| 9: |
| 10:    Function CQRecurse(Queries P, Index $l_0$) |
| 11:        for l = $l_0$ + 1 to d do |

-continued

Algorithm 3

| 12 | P' ← Holds temporary queries computed |
| 13: | for each query q in P do |
| 14: | for each predicate $q_l$ in P[l] do |
| 15: | Add query q ∧ $q_l$ to P' P ← P∪P' |
| 16: | CQRecurse( P' , l) |

6.2 Computing Optimal Explanations

In the second stage, we compute the optimal explanation from the generated candidate queries. In Section 2, we defined the weight associated with each query as follows.

$$w(q) = |E(R)\backslash\text{cover}(q)| + \lambda^* |\text{cover}(q) \cap C|$$

Our goal is to cover in E the tuples in E(R), while minimizing the sum of weights of the queries in E. An explanation is optimal if and only if a solution to the weighted set cover is optimal. By using the greedy algorithm for weighted set cover, we can compute a log(|E(R)|)-approximation to the optimal solution. The explanation is constructed incrementally by selecting one query at a time. Let the marginal cover of a new query q w.r.t. E be defined as the number of tuples from (R) that are in q and that are not already present in E:

$$m\text{cover}(q) = (q \cap E(R))\backslash(E \cap E(R))$$

Algorithm 4
GreedyPDC(candidate queries P of table R)

```
1: E_opt ← { }
2: bcover(E_opt) ← { }
3: while bcover(E_opt) < |E(R)| do
4:   minCost ← ∞
5:   min_q ← null
6:   for each query q∈P do 7:     cost(q) ← w(q) / mcover(q)

8:     if cost(q) ≤ minCost then
9:     if cost(q) = minCost and bcover(q) < bcover(min_q) then
10:      continue to next query
11:    min_q ← q
12    minCost = cost(q)
13:   Add min_q to E_opt
14:   bcover(E_opt) ← bcover(E_opt) ∪ bcover(min_q)
```

At each step, Algorithm 4 adds to E the query that minimizes the weight and maximizes the marginal cover. Let bcover(q)=E(R)∩cover(q), similarly for bcover($E_{opt}$).

Parameter λ weighs the relative importance of the clean tuples w.r.t. errors. In practice, the number of errors in a database is a small percentage of the data. If clean and erroneous tuples are weighted equally in the weight function, selective queries that do not cover clean tuples are favored. This can lead to a large explanation size. We set the parameter λ to be the error rate, as it reflects the proportion between errors and clean tuples. If the error rate is very low, it is harder to get explanation with few clean tuples, thus we give them a lower weight in the function. If there are many errors, clean tuples should be considered more important in taking a decision. For mining at the source level (3 and 4 in FIG. 3), we estimate the error rate by dividing the number of likely errors by the number of tuples in the lineage of the transformation (either violations or errors from the target).

7 EXPERIMENTS

We now evaluate our techniques (Refer to FIG. 3). In Section. 7.1, we describe our evaluation dataset along with the methodology developed to induce errors at the source data, algorithms compared and metrics used. In Section 7.2, we perform three experiments to study (1) the quality of error discovery, (2) the quality of explanations and (3) the running time of various modules in the system.

7.1 Evaluation Dataset and Metrics

In order do an end-to-end evaluation of our system we require a data setup that has a source schema with several relations and a set of target schemas on which business rules can be defined. We observe that the TPC-H Benchmark synthetic data generator best serves our purpose as it defines a general schema typical of many businesses and its 22 queries can easily be considered as our target reports. We define rules over target views defined by a select set of queries chosen appropriately. We extend the TPC-H Data Generator with an error induction methodology developed by us.

Data Quality Rules on Target Views

The goal is to be able to define a set of meaningful rules over a select set of target views (among those defined by the 22 queries defined by the benchmark). Not all queries are amenable to this exercise. For our validation, we picked two representative queries, namely Q3, and Q10 among them. We then identified two types of rules in $\Sigma^D$, FDs and Check Constraints, which can be defined easily for the schemas of Q3 and Q10. Violations on the target data are detected w.r.t. the following rules divided into three scenarios:

Scenario S1: $c_{Q10}$: ∀ $t_\alpha$.revenue>$\delta_1$).

Scenario S2: $c'_{Q10}$: ∀ $t_\alpha$.name=$t_\beta$.name ∧ $t_\alpha$.c_phone[1,2] ≠$t_\beta$.c_phone [1,2]).

Scenario S3: $c_{Q3}$: ∀ $t_\alpha$.revenue>$\delta_2$), $c'_{Q3}$: $t_\alpha$.o_orderdate=$t_\beta$.o_orderdate
∧ $t_\alpha$.o_shippriority≠$t_\beta$.o_shippriority).

Rules $c_{Q10}$ and $c_{Q3}$ are check constraints over one tuple, while $c_{Q10}'$ and $c_{Q3}'$ are FDs over pairs of tuples. In the evaluation, we focus on rules in $\Sigma^D$ to show the impact of (i) the repair computation over the target and of (ii) the scoring in the rewriting.

Error Induction on TPC-H

Here, we discuss our error induction methodology on the source relations in order to test the scenarios comprising the queries and rules listed above.

Data Generation.

We first generate an instance of TPC-H schema of desired size and queries using the functionalities of dbgen and qgen respectively. We then assign appropriate values to parameters (if any) in the rules described above to make sure that the target reports generated by the queries have no violations w.r.t. the rules. For instance, in the rule $c_{Q10}$ of Q10 given by $t_\alpha$.revenue>$\delta_1$), we fix a value (e.g., 10000.0) $\delta_1$ for an experiment. The values are chosen appropriately to ensure that the target report initially has no violations w.r.t. the rule. We now introduce some errors randomly in the source relations involved in the query such that when the target view is recomputed with those errors in the source data, it has violations w.r.t. the same rules. In the following, we describe how these errors are induced in the source relations.

Inducing errors is a delicate task because of the decoupling in space we mentioned earlier; errors originate at the source and are validated at the target after a transformation. Each experiment has a source instance D, a transformation Q, and target rules $\Sigma$. We begin with the set of target attributes involved in a rule $r \in \Sigma$ and trace the source relations and attributes (using the query) from which the target attributes are computed. We then obtain a subspace of the source data defined by the source tuples selected by the query and the source attributes. This subspace forms the scope of our error induction methods. We now describe how source attributes and tuples are selected for error induction from this subspace.

Selecting Source Attributes.

There are two types of rules in the listed scenarios, one is the check constraint (S1-$c_{Q10}$, S3-$c_{Q3}$) and the other is an FD (S2-$c_{Q10}'$, S3-$c_{Q3}'$). We first discuss how check constraints are handled, which have only one target attribute denoted by $A^T$ (e.g., in $c_{Q10}$ of Q10 revenue is computed from the expression lineitem.l_extendeprice*(1−lineitem.l_discount)). We randomly select an attribute $A^s$ of source S from the attribute set $A^S$ that defined $A^T$, such that $A^T$ is monotonically increasing with $A^s$ in the algebraic expression of the query which computed $A^T$. For example, lineitem.l_extendedprice is a good candidate for $c_{Q10}$ in the above expression. For FDs, the candidate source attributes for error induction are computed using the R.H.S. attributes of the FD. We choose one of the source attributes that contributed to the R.H.S attribute randomly to induce an error in the values of tuples. For example, c_phone in $c_{Q10}'$ is computed from customer.c_phone, which is our candidate source attribute on which errors are introduced.

Selecting Source Tuples.

We now discuss how tuples are selected for error induction. Since our ultimate goal is to explain errors, we induce errors s.t. they happen on tuples covered by some pre-set explanations, or ground explanations. This allows us to test how good are we at recovering these explanations. Thus, we induce errors over tuples that satisfy a given set of ground explanations over the source, such as $E_g = \{q_1:$ (lineitem.l_ship=RAIL)$\}$, while enforcing that attributes $E_g$ and $A^S$ are disjoint.

Inducing Errors.

We only consider source tuples that are in the lineage of the query, since we cannot validate at the target the tuples that are not selected by the transformation. We consider three parameters for error generation: (1) source error rate e (number of error tuples divided by the size of Lin(T), (2) pattern rate n (the percentage of error tuples to induce on $E_g$) and (3) random rate e·Lin(T)−n·|$E_g$| (the number of error tuples to induce on tuples in Lin(T)\$E_g$) Given e and n, we select data tuples at random from those that satisfy the queries in $E_g$ until n tuples are selected. We introduce on these n tuples on corresponding attributes. For the remaining errors e·Lin(V(T))−n, we add random noise over tuples that don't satisfy $E_g$ but are in the lineage of the query. For example, given |Lin(T)|=100, an explanation with one query, the error rate e is 10% (10 tuples) and n=5, 5 tuples must be from queries that satisfy $E_g$ and 5 tuples randomly selected from lineage other than $E_g$. We vary e for $E_g$ from 1% to 50%, and n as either $$e \cdot \frac{Lin(T)}{|E_g|} \text{ or } 0.5 \cdot e \cdot \frac{Lin(T)}{|E_g|}.$$

This implies that we either induce all the errors on a pre-set explanation $E_g$ or 50% of the errors on a pre-set explanation and the remaining 50% on random tuples in the lineage.

We change values of source attributes identified before ($A^S$) making sure that an error causes at least one violation over the target view w.r.t. $\Sigma$. For value modification, we use different methods depending on the nature of the attribute and the data quality rule. For numerical values in check constraint, we introduce an outlier that depends on the value of parameter $\delta$ in the quality rule. For strings (as in FDs), we replace the value with another value from the active domain of the attribute or induce a typo character randomly in the string.

Inducing Errors on Join Attributes.

Here, we describe a procedure to induce errors on a join attribute between lineitem and orders in Scenario S3, different from the above procedure. The idea is to replace the value of the join attribute in a tuple in the orders relation with another value such that tuples from lineitem which did not join before will join now with this tuple from orders increasing the number of tuples in a group. Hence, there is a spike in the aggregate value of the group causing to violate $c_{Q3}$. In the previous procedure for scenarios S1 and S2, it is sufficient to induce an error in one source tuple to trigger a target violation, while in this procedure we need to induce errors on multiple tuples to trigger a violation on both the rules separately. We perform an experiment on S3 using this error induction procedure and evaluate our techniques.

Metrics

We introduce two metrics to test the components of DBRx. We focus on the source level since our goal is to evaluate our contributions and not to measure the quality of the repair algorithm over the target. Moreover, TPC-H queries do not consider union, neither they expose metadata over the query result. For each proposed metric, we show how to compute precision (P) and recall (R). Besides the standard F-Measure, we also use the following performance metrics:

Error Discover Quality—evaluates the quality of the likely errors discovery and the scoring. We compare the errors computed by Error over the lineage versus the changes introduced in the errors induction step.

$$P_{Err} = \frac{E(T) \cap B}{E(T)}$$

$$R_{Err} = \frac{E(T) \cap B}{B}$$

Explanation Quality—evaluates the quality of the discovered explanations. This metric evaluates the overall process of the prescriptive cleaning at the source level (3 and 4 in FIG. 3). We measure the quality of an explanation computed by DBRx by testing the tuples overlap with the ground explanation.

$$P_E = \frac{\text{cover}(E_{opt}) \cap \text{cover}(E_g)}{\text{cover}(E_{opt})}$$

$$R_E = \frac{\text{cover}(E_{opt}) \cap \text{cover}(E_g)}{\text{cover}(E_g)}$$

Algorithms

We implemented the algorithms introduced in the paper and baseline techniques to compare the results.

For scoring, we implemented the proposed Algorithms described in Section 4 for scores computation. We combine them with the technique based on outliers detection (Local Outliers) and with the one based on the facility location problem (Global-FLP). As baseline, we consider all the tuples in the lineage with the same score (No-Let), and the tuple(s) with highest score for each violation (Top-1). For explanation discovery, we implemented Algorithm 6.2.

7.2 Experimental Results

We now discuss three experiments designed to measure the quality and scalability of the various modules in our system over the three scenarios defined above. Moreover, since we can compute target repairs for these scenarios, for each scenario we discuss cases 3 (rewrite target E(T)) and 4 (rewrite target V(T)). All measures refer to the relations where the errors have been introduced.

Experiment A: Quality of Error Discovery

We test the quality of the scoring module and of the algorithms for likely errors computation with the error measures.

Figure 9A:
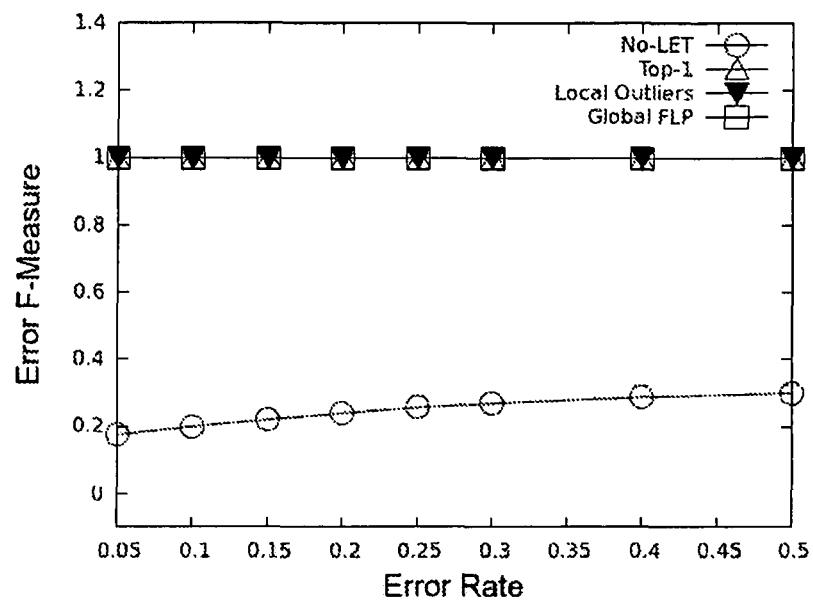
Figure 9B:
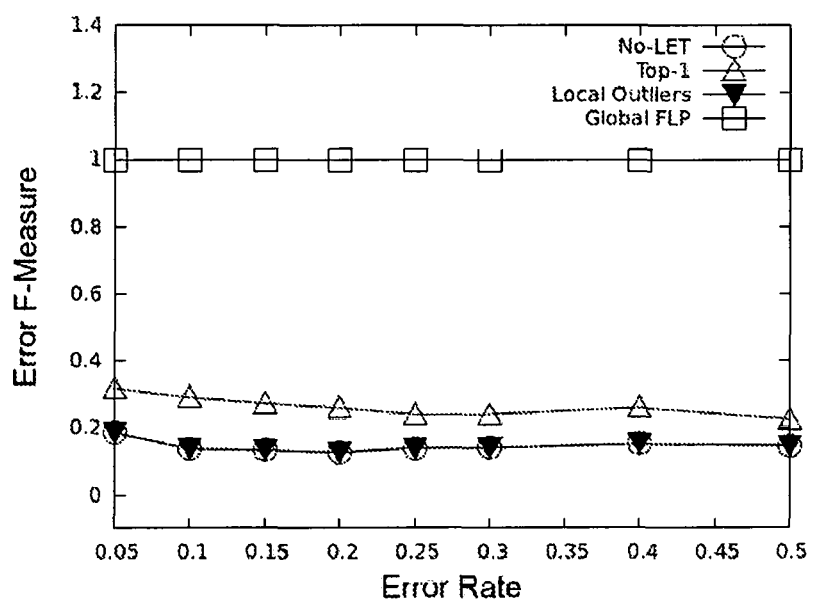
Figure 9C:
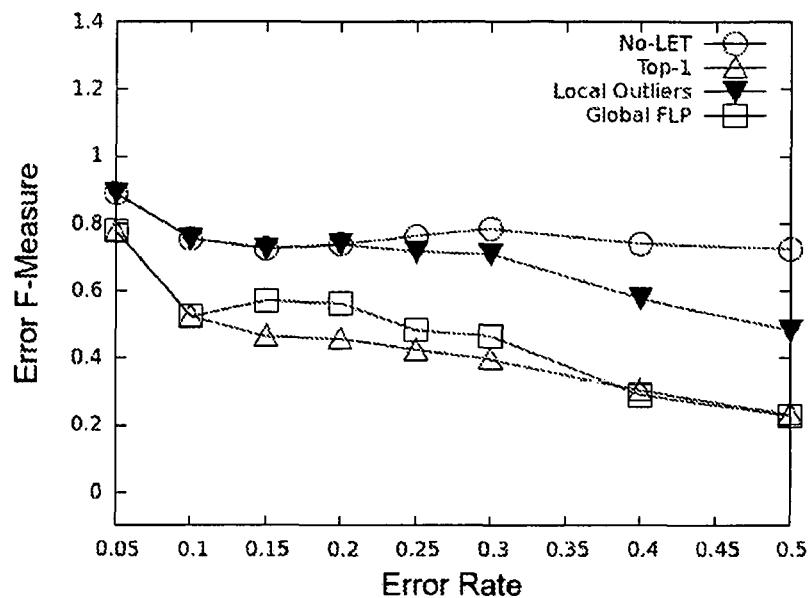
Figure 9D:
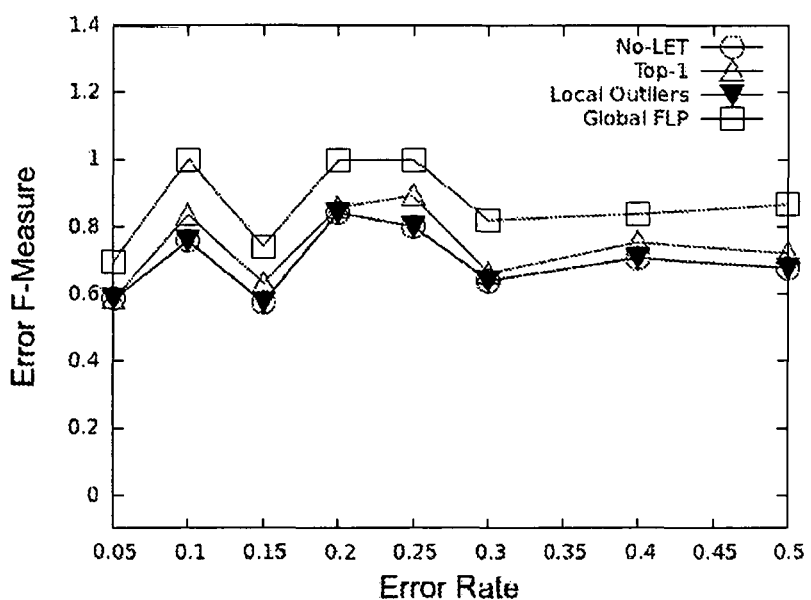

In ExpA-1, we fix the queries in the ground explanation and increase the error rate without random errors. Higher error rate implies a larger number of problematic tuples for each query. FIG. 9(a) shows that all the methods perform well for S1, with the exception of the method that consider the entire lineage (No-LET). This shows that computing errors is easy when there is only a simple check constraint over an aggregate value. FIG. 9(b) shows that only Global-FLP obtains high F-measure with S2. This is because it uses the global information given by many pair-wise violations. FIG. 9(c) shows that with multiple constraints and multiple errors the methods obtain comparable results. However, a close analysis shows that, despite multiple errors violating the hypothesis of Global-FLP, this method achieves the best precision, while the best recall is obtained by considering the entire lineage as errors. FIG. 9(d) shows the error F-measure for S2, but computed on the rewriting of the target repair 3. Interestingly, compared to FIG. 9(b), the methods have similar performance: Global-FLP does slightly worse, while all the others improve. This reflects the effect of the target repair at the source level: it gives less, but more precise, information to the error discovery. This is good for all local methods, but provides less context to Global-FLP, the only one that takes advantage of the larger amount of evidence in 4.

FIG. 9(d) shows S2 for the rewriting of the target repair 3. As expected, by comparing to FIG. 9(b) it is evident that the results improve thanks to the more precise evidence traced to the source level. Similar improvement is observed in S3.

In ExpA-2, we fix two queries in the ground explanation and increase the error rate with 50% random errors. FIG. 9(i) reports the error F-measure for S3. Despite the many random errors, the results do not differ much for the simpler scenario in FIG. 9(c). Similar results are observed for S1 and S2.

Experiment B: Quality of Explanations

We test the quality of the explanation discovery module by looking at the explanation measures.

In ExpB-1, we fix the queries in the ground explanation and increase the error rate without random errors.

Figure 9E:
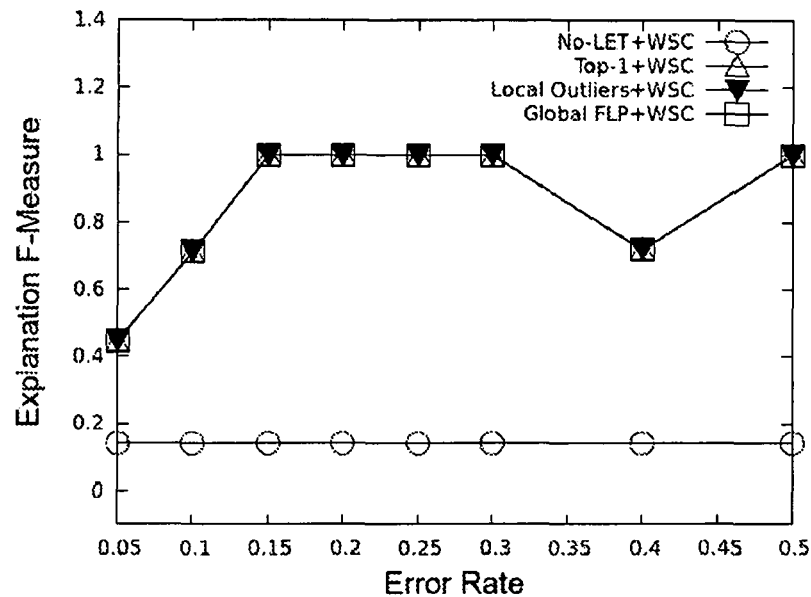
Figure 9F:
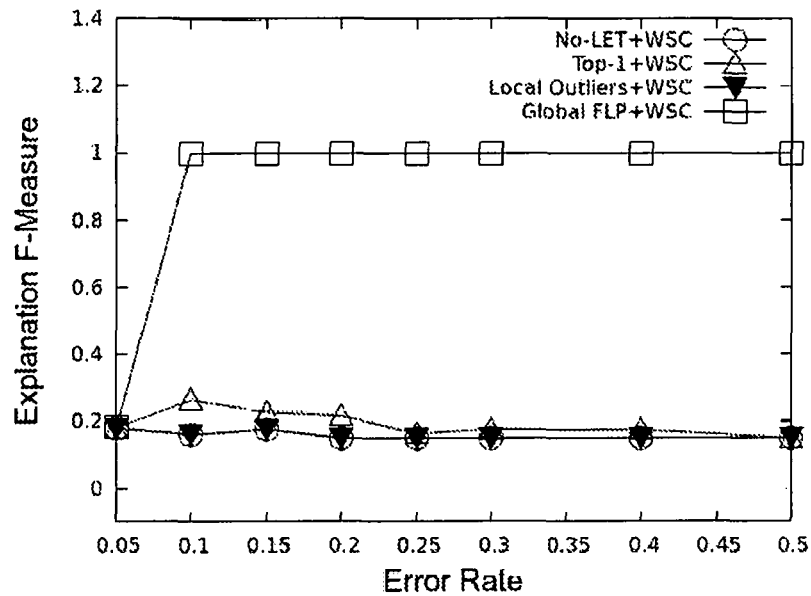
Figure 9G:
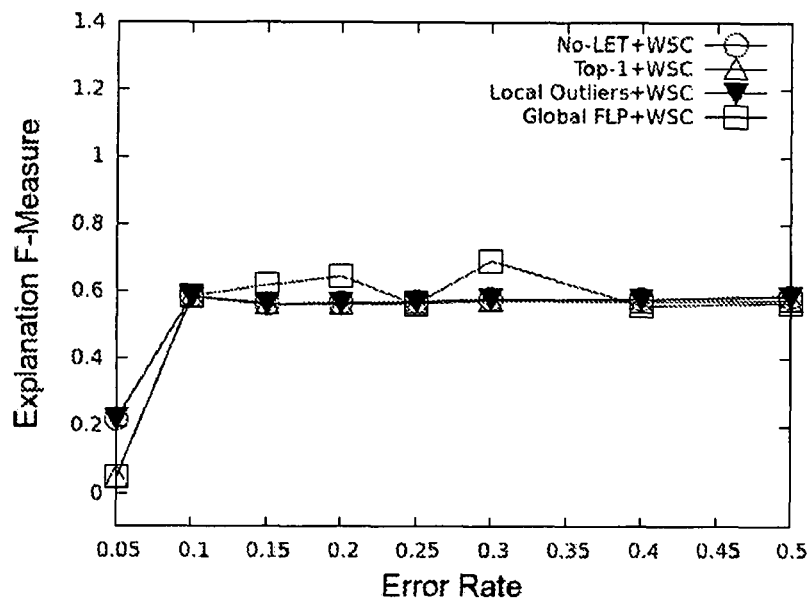
Figure 9H:
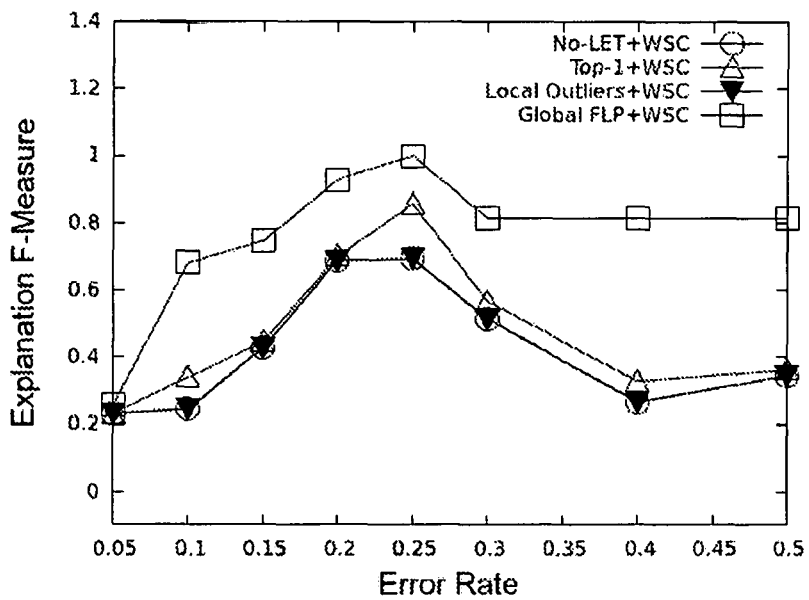
Figure 9I:
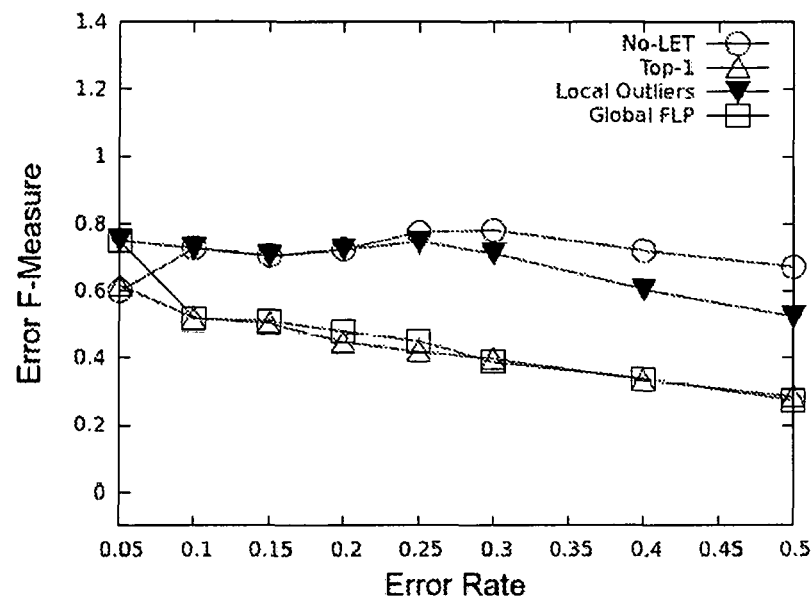
Figure 9J:
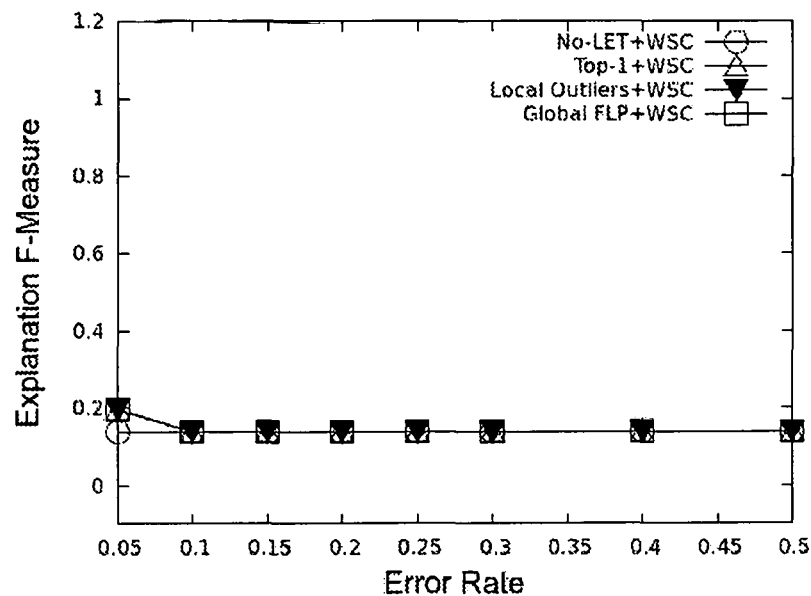

FIG. 9(e) shows that all the errors detection methods have similar results, with the exception of the one considering errors the entire lineage. This is not surprising, as in this scenario the error is easy to identify and the size of the aggregate is very large, thus the entire lineage will never lead to correct explanations. FIG. 9(f) reflects the quality of the error detection of Global-FLP (FIG. 9(b)), while FIG. 9(g) shows that the precision has higher impact than the recall for the discovery of explanation. In fact, despite the low recall in error detection of Global-FLP, its high precision leads to the best explanations. FIG. 9(h) shows the explanation F-measure for S2 on the rewriting of the target repair 3. Compared to FIG. 9(g), most of the methods do better, while Global-FLP does worse. This is a direct consequence of the detect error quality in FIG. 9(d).

Figure 9K:
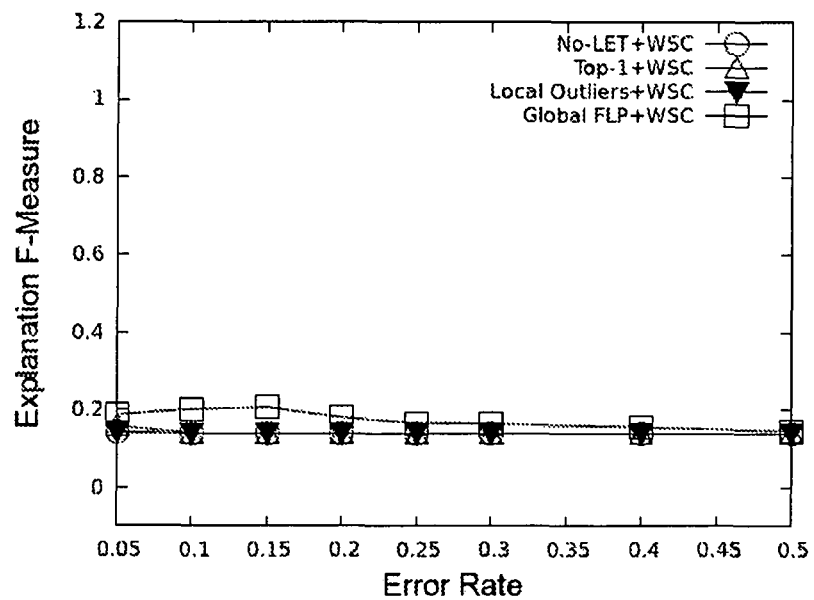
Figure 9L:
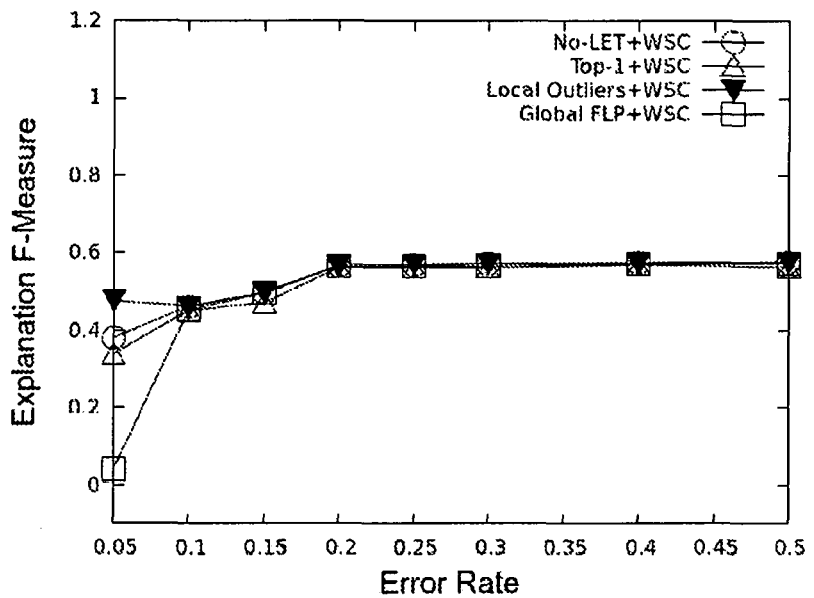

In ExpB-2, we fix two queries in the ground explanation and increase the error rate with 50% random errors. FIGS. 9(i) and 9(k) show explanation F-measure for scenarios S1 and S2, respectively. Despite the error discovery did not changed much with the random noise, the discovery of explanation is affected in these two scenarios, as clear with the comparison against FIG. 9(e) and FIG. 9(f). This behaviour shows that the quality of the explanations is only partially related to the error detection and that when the queries are mixed with random errors, it is very hard to identify them precisely. On the other hand, FIG. 9(l) shows consistent result w.r.t. to the case without random errors (FIG. 9(g)). This result shows that the accumulation of errors from two different quality rules has a strong effect that still holds even in noisy scenarios.

Experiment C: Running Time

We measured the average running time for datasets of TPC-H of size 10 MB and 100 MB. For the 100 MB dataset and S1, the average running time across different error rates is 100.29 seconds for rewriting the violations and computing their score. The average running time for the Error function is less than 2 seconds, while the pattern mining, including the candidate pattern generation, is 52 seconds. The results for S2 and 100 MB vary only in the rewriting module, as it takes 430 seconds because of the large number of pair-wise violations. The execution times for 10 MB are at least 10 times smaller with all modules.

When used in this specification and claims, the terms "comprises" and "comprising" and variations thereof mean that the specified features, steps or integers are included. The terms are not to be interpreted to exclude the presence of other features, steps or components.

TECHNIQUES FOR IMPLEMENTING ASPECTS OF EMBODIMENTS OF THE INVENTION

[1] G. Beskales, I. F. Ilyas, and L. Golab. Sampling the repairs of functional dependency violations under hard constraints. PVLDB, 3(1):197-207, 2010.
[2] P. Bohannon, W. Fan, F. Geerts, X. Jia, and A. Kementsietsidis. Conditional functional dependencies for data cleaning. In ICDE, pages 746-755, 2007.
[3] J. Cheney, L. Chiticariu, and W. C. Tan. Provenance in databases: Why, how, and where. Foundations and Trends in Databases, 1(4):379-474, 2009.
[4] X. Chu, I. F. Ilyas, and P. Papotti. Holistic data cleaning: Putting violations into context. In ICDE, 2013.
[5] V. Chvatal. A greedy heuristic for the set-covering problem. Mathematics of operations research, 4(3):233-235, 1979.

[6] G. Cong, W. Fan, F. Geerts, J. Li, and J. Luo. On the complexity of view update analysis and its application to annotation propagation. IEEE TKDE, 24(3):506-519, 2012.
[7] Y. Cui and J. Widom. Practical lineage tracing in data warehouses. In ICDE, pages 367-378, 2000.
[8] A. Das Sarma, A. Parameswaran, H. Garcia-Molina, and J. Widom. Synthesizing view definitions from data. In ICDT, pages 89-103, 2010.
[9] X. L. Dong, L. Berti-Equille, and D. Srivastava. Truth discovery and copying detection in a dynamic world. PVLDB, 2(1):562-573, 2009.
[10] W. Fan and F. Geerts. Foundations of Data Quality Management. Morgan & Claypool Publishers, 2012.
[11] W. Fan, S. Ma, Y. Hu, J. Liu, and Y. Wu. Propagating functional dependencies with conditions. PVLDB, 1(1): 391-407, 2008.
[12] M. Herschel and M. A. Hernández. Explaining missing answers to spjua queries. PVLDB, 3(1):185-196, 2010.
[13] D. S. Hochbaum. Heuristics for the fixed cost median problem. Mathematical programming, 22(1): 148-162, 1982.
[14] W. H. Inmon. Building the Data Warehouse. John Wiley Publishers, 2005.
[15] B. Kanagal, J. Li, and A. Deshpande. Sensitivity analysis and explanations for robust query evaluation in probabilistic databases. In SIGMOD, pages 841-852, 2011
[16], S. Kolahi and L. V. S. Lakshmanan. On approximating optimum repairs for functional dependency violations. In ICDT, 2009.
[17] A. Meliou, W. Gatterbauer, S. Nath, and D. Suciu. Tracing data errors with view-conditioned causality. In SIGMOD, pages 505-516, 2011.
[18] P. B. Mirchandani and R. L. Francis. Discrete location theory. 1990.
[19] Transaction Processing Performance Council. The TPC Benchmark H 2.16.0. http://www.tpc.org/tpch, 2013.
[20] Q. T. Tran and C.-Y. Chan. How to conquer why-not questions. In SIGMOD, pages 15-26, 2010.
[21] E. Wu, S. Madden, and M. Stonebraker. A demonstration of dbwipes: Clean as you query. PVLDB, 5(12): 1894-1897, 2012.
[22] E. Wu and S. Madden. Scorpion: Explaining away outliers in aggregate queries. PVLDB, 6(8), 2013.

The invention claimed is:

1. A system for checking data for errors, the system comprising:
a checking module operable to check tuples of data stored in a target database for errors, the tuples in the target database originating from the output of at least one query transformation module which applies a query transformation to tuples of data from at least one data source;
an identification module operable to identify a problematic tuple from a data source that produces an error in the target database, the identification module being operable to quantify the contribution of the problematic tuple in producing the error in the target database,
a description generation module operable to generate a descriptive query which represents at least one of:
errors identified by the checking module in the target database which are produced by the at least one query transformation module, and
problematic tuples identified in a data source by the identification module; and
a correction module which is operable to use the descriptive query to modify at least one of:
the at least one query transformation module to correct an error produced by the at least one query transformation module; and
a data source to correct problematic tuples in the data source.

2. The system of claim 1, wherein the descriptive query comprises lineage data which indicates at least one of a query transformation module producing the error and a data source comprising a problematic tuple.

3. The system of claim 1, wherein the system further comprises the at least one transformation module and the at least one transformation module is operable to modify the transformation applied by the transformation module so that the transformation module does not produce an error in the target database.

4. The system of claim 1, wherein the checking module is operable to receive at least one quality rule and to check the data stored in the target database to detect if the data violates each quality rule, and wherein the system further comprises a violations storage module which is operable to store data that violates at least one of the quality rules in a violation table.

5. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated; and
wherein the system further comprises a violations storage module which is operable to store data that violates at least one of the quality rules in a violation table.

6. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table; and
wherein a processing module operable to process the data stored in the violations table to identify an error value for at least one attribute in the violations table, the error value indicating the probability of the attribute violating a quality rule.

7. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table;
wherein a processing module is operable to process the data stored in the violations table to identify an error value for at least one attribute in the violations table, the error value indicating the probability of the attribute violating a quality rule; and wherein the system further comprises a query module which is operable to provide at least one query to the target database and to record the number of clean and erroneous tuples of data that are returned by the at least one query.

8. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table;
wherein a processing module is operable to process the data stored in the violations table to identify an error value for at least one attribute in the violations table, the error value indicating the probability of the attribute violating a quality rule, and to store an annotation associated with the record of each tuple of data stored in the violations table with a weight value indicating the probability of the tuple violating a quality rule in response to a query to the target database; and
wherein the system further comprises a query module which is operable to provide at least one query to the target database and to record the number of clean and erroneous tuples of data that are returned by the at least one query.

9. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table;
wherein a processing module is operable to process the data stored in the violations table to identify an error value for at least one attribute in the violations table, the error value indicating the probability of the attribute violating a quality rule, and to store an annotation associated with the record of each tuple of data stored in the violations table with a weight value indicating the probability of the tuple violating a quality rule in response to a query to the target database;
wherein the system further comprises a query module which is operable to provide at least one query to the target database and to record the number of clean and erroneous tuples of data that are returned by the at least one query; and
wherein the system further comprises a contribution score vector calculation module operable to calculate a contribution score vector indicating the probability of a tuple of data causing an error, and wherein the processing module is operable to annotate the record of each tuple of data stored in the violations table with the calculated contribution score vector.

10. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table;
wherein a processing module is operable to process the data stored in the violations table to identify an error value for at least one attribute in the violations table, the error value indicating the probability of the attribute violating a quality rule, and to store an annotation associated with the record of each tuple of data stored in the violations table with a weight value indicating the probability of the tuple violating a quality rule in response to a query to the target database;
wherein the system further comprises a query module which is operable to provide at least one query to the target database and to record the number of clean and erroneous tuples of data that are returned by the at least one query;
wherein the system further comprises a contribution score vector calculation module operable to calculate a contribution score vector indicating the probability of a tuple of data causing an error; and wherein the processing module is operable to annotate the record of each tuple of data stored in the violations table with the calculated contribution score vector; and
wherein the system further comprises a removal score vector calculation module operable to calculate a removal score vector which indicates if a violation can be removed by removing a tuple of data from a data source.

11. The system of claim 1, wherein the checking module is operable to
receive at least one quality rule and to check the data stored in the target database to detect if the data violates each quality rule and identify at least one attribute in a tuple of data stored in the violation table that violates at least one of the quality rules, and to identify the data source from which the attribute originated;
wherein the system further comprises a violations storage module which is operable to store data that violates at least one of the quality rules in a violation table;
wherein a processing module is operable to process the data stored in the violations table to identify an error value for at least one attribute in the violations table, the error value indicating the probability of the attribute violating a quality rule, and to store an annotation associated with the record of each tuple of data stored in the violations table with a weight value indicating the probability of the tuple violating a quality rule in response to a query to the target database;
wherein the system further comprises a query module which is operable to provide at least one query to the target database and to record the number of clean and erroneous tuples of data that are returned by the at least one query;
wherein the system further comprises a contribution score vector calculation module operable to calculate a contribution score vector indicating the probability of a tuple of data causing an error, and wherein the processing module is operable to annotate the record of each tuple of data stored in the violations table with the calculated contribution score vector; and
wherein the system further comprises a distance calculation module operable to calculate the relative distance between the tuples in the data entries stored in the violations table that have a contribution score vector or a removal score vector above a predetermined threshold.

12. A computer implemented method for checking data for errors, the method comprising:
    checking tuples of data stored in a target database for errors, the tuples in the target database originating from the output of at least one query transformation module which applies a query transformation to tuples of data from at least one data source;
    identifying a problematic tuple from a data source that produces an error in the target database and quantifying the contribution of the problematic tuple in producing the error in the target database,
    generating a descriptive query which represents at least one of:
        errors identified by the checking of the tuples of data stored in the target database which are produced by the at least one query transformation module, and
        problematic tuples identified in a data source by the identification of the problematic tuple from the data source, and
    using the descriptive query to modify at least one of:
        the at least one query transformation module to correct an error produced by the at least one query transformation module; and
        a data source to correct problematic tuples in the data source.

13. The method of claim 12,
    using the descriptive query to modify at least one of:
        the at least one query transformation module to correct an error produced by the at least one query transformation module; and
        a data source to correct problematic tuples in the data source; and
    wherein the descriptive query comprises lineage data which indicates at least one of a query transformation module producing the error and a data source comprising a problematic tuple.

14. The method of claim 12, wherein the checking step comprises:
    providing at least one quality rule;
    checking the data stored in the target database to detect if the data violates each quality rule; and
    storing the data that violates at least one of the quality rules in a violation table.

15. The method of claim 12, wherein the checking step comprises:
    providing at ea one quality rule;
    checking the data stored in the target database to detect if the data violates each quality rule;
    storing the data that violates at least one of the quality rules in a violation table;
    identifying at least one attribute in a tuple of data stored in the violation table that violates at least one of the quality rules; and
    identifying the data source from which the attribute originated.

16. The method of claim 12, wherein the checking step comprises:
    providing at least one quality rule;
    checking the data stored in the target database to detect if the data violates each quality rule;
    storing the data that violates at least one of the quality rules in a violation table;
    identifying at least one attribute in a tuple of data stored in the violation table that violates at least one of the quality rules;
    identifying the data source from which the attribute originated; and
    processing the data stored in the violations table to identify an error value for at least one attribute in the violations table, the error value indicating the probability of the attribute violating a quality rule.

17. The method of claim 12, wherein the checking step comprises:
    providing at least one quality rule;
    checking the data stored in the target database to detect if the data violates each quality rule;
    storing the data that violates at least one of the quality rules in a violation table;
    identifying at least one attribute in a tuple of data stored in the violation table that violates at least one of the quality rules;
    identifying the data source from which the attribute originated; and
    processing the data stored in the violations table to identify an error value for at least one attribute in the violations table, the error value indicating the probability of the attribute violating a quality rule; and
    providing at least one query to the target database and recording the number of clean and erroneous tuples of data that are returned by the at least one query.

18. The method of claim 12, wherein the checking step comprises:
    providing at least one quality rule;
    checking the data stored in the target database to detect if the data violates each quality rule;
    storing the data that violates at least one of the quality rules in a violation table;
    identifying at least one attribute in a tuple of data stored in the violation table that violates at least one of the quality rules;
    identifying the data source from which the attribute originated;
    processing the data stored in the violations table to identify an error value for at least one attribute in the violations table, the error value indicating the probability of the attribute violating a quality rule;
    providing at least one query to the target database and recording the number of clean and erroneous tuples of data that are returned by the at least one query; and
    annotating the record of each tuple of data stored in the violations table with a weight value indicating the likelihood of the tuple violating a quality rule in response to a query to the target database.

19. The method of claim 12, wherein the checking step comprises:
    providing at least one quality rule;
    checking the data stored in the target database to detect if the data violates each quality rule;
    storing the data that violates at least one of the quality rules in a violation table;
    identifying at least one attribute in a tuple of data stored in the violation table that violates at least one of the quality rules;
    identifying the data source from which the attribute originated; and
    processing the data stored in the violations table to identify an error value for at least one attribute in the violations table, the error value indicating the probability of the attribute violating a quality rule;

providing at least one query to the target database and recording the number of clean and erroneous tuples of data that are returned by the at least one query;

annotating the record of each tuple of data stored in the violations table with a weight value indicating the likelihood of the tuple violating a quality rule in response to a query to the target database; and calculating a contribution score vector indicating the probability of a tuple of data causing an error and annotating the record of each tuple of data stored in the violations table with the calculated contribution score vector.

20. The method of claim 12, wherein the checking step comprises:

providing at least one quality rule;

checking the data stored in the target database to detect if the data violates each quality rule;

storing the data that violates at least one of the quality rules in a violation table;

identifying at least one attribute in a tuple of data stored in the violation table that violates at least one of the quality rules;

identifying the data source from which the attribute originated;

processing the data stored in the violations table to identify an error value for at least one attribute in the violations table, the error value indicating the probability of the attribute violating a quality rule;

providing at least one query to the target database and recording the number of clean and erroneous tuples of data that are returned by the at least one query;

annotating the record of each tuple of data stored in the violations table with a weight value indicating the likelihood of the tuple violating a quality rule in response to a query to the target database;

calculating a contribution score vector indicating the probability of a tuple of data causing an error and annotating the record of each tuple of data stored in the violations table with the calculated contribution score vector; and computing a removal score vector which indicates if a violation can be removed by removing a tuple of data from a data source.

21. The method of claim 12, wherein the checking step comprises:

providing at least one quality rule;

checking the data stored in the target database to detect if the data violates each quality rule;

storing the data that violates at least one of the quality rules in a violation table;

identifying at least one attribute in a tuple of data stored in the violation table that violates at least one of the quality rules;

identifying the data source from which the attribute originated; and processing the data stored in the violations table to identify an error value for at least one attribute in the violations table, the error value indicating the probability of the attribute violating a quality rule;

providing at least one query to the target database and recording the number of clean and erroneous tuples of data that are returned by the at least one query;

annotating the record of each tuple of data stored in the violations table with a weight value indicating the likelihood of the tuple violating a quality rule in response to a query to the target database;

calculating a contribution score vector indicating the probability of a tuple of data causing an error and annotating the record of each tuple of data stored in the violations table with the calculated contribution score vector; computing a removal score vector which indicates if a violation can be removed by removing a tuple of data from a data source; and determining the relative distance between the tuples in the data entries stored in the violations table that have a contribution score vector or a removal score vector above a predetermined threshold.

\* \* \* \* \*